United States Patent
Yasuda et al.

(10) Patent No.: US 9,148,557 B2
(45) Date of Patent: Sep. 29, 2015

(54) FOCUS ADJUSTMENT APPARATUS AND METHOD, AND IMAGE CAPTURING APPARATUS AND CONTROL METHOD THEREOF

(75) Inventors: Hitoshi Yasuda, Tokyo (JP); Kazunori Ishii, Yokohama (JP); Atsuya Kawanishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 13/177,739

(22) Filed: Jul. 7, 2011

(65) Prior Publication Data

US 2012/0013786 A1   Jan. 19, 2012

(30) Foreign Application Priority Data

Jul. 16, 2010   (JP) ................................ 2010-162212
Aug. 30, 2010   (JP) ................................ 2010-192702
Aug. 30, 2010   (JP) ................................ 2010-192917

(51) Int. Cl.
H04N 5/232   (2006.01)

(52) U.S. Cl.
CPC ....... *H04N 5/23212* (2013.01); *H04N 5/23219* (2013.01)

(58) Field of Classification Search
CPC ................................................ H04N 5/23212
USPC .................. 348/208.12, 208.15, 333.04, 345
See application file for complete search history.

(56) References Cited

U.S. PATENT DOCUMENTS

| | | | |
|---|---|---|---|
| 2006/0012702 A1* | 1/2006 | Kawahara et al. | 348/345 |
| 2009/0073304 A1* | 3/2009 | Kumagai et al. | 348/345 |
| 2009/0167931 A1* | 7/2009 | Kanai et al. | 348/349 |

FOREIGN PATENT DOCUMENTS

| | | |
|---|---|---|
| JP | 61-039009 A | 2/1986 |
| JP | 2001-215403 | 8/2001 |
| JP | 2006-227080 | 8/2006 |
| JP | 2009-020190 | 1/2009 |
| JP | 2009-157130 A | 7/2009 |
| JP | 2009-229584 A | 10/2009 |
| JP | 2010-156851 A | 7/2010 |

OTHER PUBLICATIONS

Jul. 4, 2014 Japanese Office Action that issued in Japanese Patent Application No. 2010-192917.

\* cited by examiner

*Primary Examiner* — Joel Fosselman

(74) *Attorney, Agent, or Firm* — Cowan, Liebowitz & Latman, P.C.

(57) ABSTRACT

A focus adjustment apparatus comprises a detection unit that detects a subject/subjects having a predetermined characteristic from an image obtained while shooting a moving picture, a selection unit that, in the case where a subject/subjects having the predetermined characteristic have been detected by the detection unit, selects, from the detected subject/subjects, a subject that also fulfills a predetermined condition, and a focus adjustment unit that controls a focus lens to focus on the subject selected by the selection unit. The focus adjustment unit does not control the focus lens in the case where no subject having the predetermined characteristic has been detected by the detection unit.

7 Claims, 25 Drawing Sheets

FIG. 5A    FIG. 5B
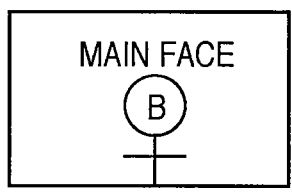
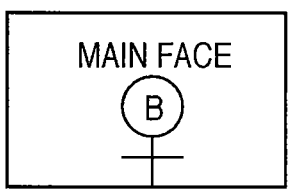
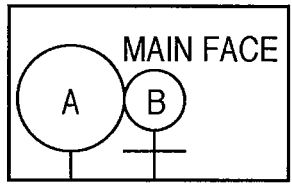
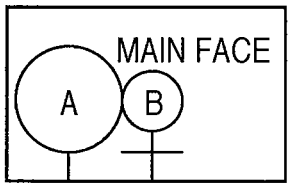
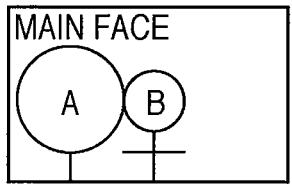
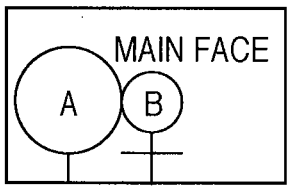

F I G. 15
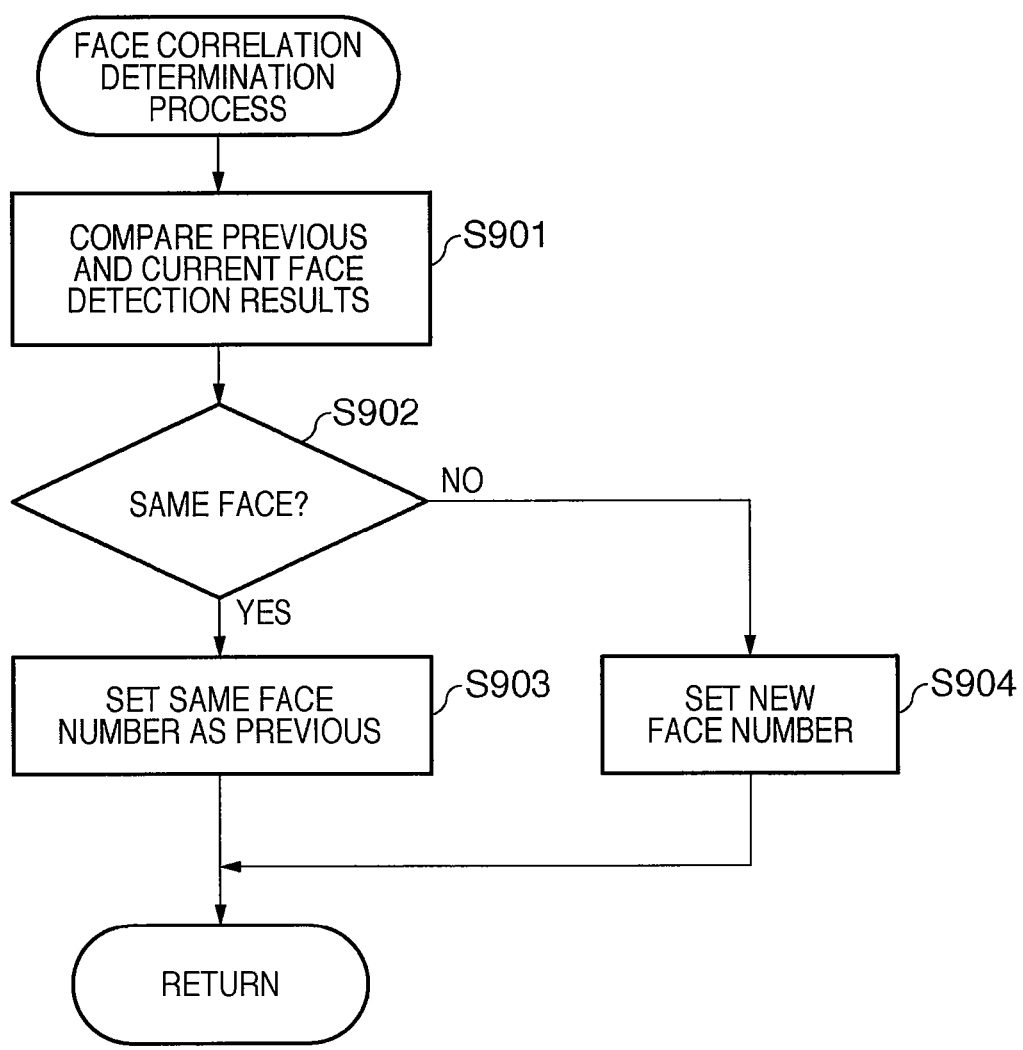

F I G. 16

|  | FIRST FACE DETECTION AF MODE | SECOND FACE DETECTION AF MODE |
|---|---|---|
| WHEN MAIN FACE IS PRESENT (FACIAL REGION PRESENT) | EXECUTE AF CONTROL ON FACIAL REGION | EXECUTE AF CONTROL ON FACIAL REGION |
| WHEN MAIN FACE IS NOT PRESENT (FACIAL REGION NOT PRESENT) | EXECUTE AF CONTROL ON SUBJECT IN CENTER OF SCENE | PROHIBIT AF CONTROL (MF CONTROL) |

FOCUS ADJUSTMENT APPARATUS AND METHOD, AND IMAGE CAPTURING APPARATUS AND CONTROL METHOD THEREOF

BACKGROUND OF THE INVENTION

1. Field of the Invention

The present invention relates to automatic focus adjustment techniques used in image capturing apparatuses and the like.

2. Description of the Related Art

Thus far, focus adjustment apparatuses in video cameras and the like have employed what is known as TV-AF focus adjustment. With the TV-AF method, focus adjustment is carried out by detecting a focus state signal indicating a level of sharpness from an image signal obtained by an image sensor performing photoelectric conversion on a subject image and controlling the position of a focus lens so that the focus state signal reaches a maximum value.

Furthermore, in recent years, techniques that perform focus adjustment by detecting the face of a person from an image obtained through shooting and setting the region corresponding to the detected face as an AF area are being widely used.

For example, Japanese Patent Laid-Open No. 2009-20190 (called "Patent Document 1" hereinafter) discloses an image capturing apparatus that shoots an image after detecting the position of a face in the image and then focusing on the detected face (this will be referred to as "face AF" hereinafter).

Meanwhile, an image capturing apparatus that performs focus detection by setting a focus detection area that includes a region detected as containing a face (see, for example, Japanese Patent Laid-Open No. 2006-227080), an image capturing apparatus that detects the eyes of a person and performs focus detection based on the detected eyes (see, for example, Japanese Patent Laid-Open No. 2001-215403), and so on have also been proposed.

However, with Patent Document 1, in the case where a face has been detected, the face is focused on, whereas in the case where a face has not been detected, the AF area set in a predetermined location of the scene is focused on. An example of a moving picture obtained through this kind of control is illustrated in FIGS. 25A through 25E. FIGS. 25A through 25E illustrate states of focus in the case where a subject enters and exits a scene that is being shot.

In FIG. 25A, no face is detected, and thus the building within a normal frame is in focus. FIG. 25B and FIG. 25C illustrate states in which a subject has entered into the scene and a face has been detected, and the face within a face frame is in focus and tracked while that face is being detected. FIG. 25D and FIG. 25E illustrate images obtained after the subject has left the scene, where the focus gradually returns once again to the building within the normal frame.

When editing a moving picture, it is preferable for editing cut points to occur when there is no movement within the picture. However, even if a moving picture such as that shown in FIGS. 25A through 25E is to be edited by cutting before and after a given image, the timing at which the cut is to be made falls in an image in which the point of focus moves (for example, from FIG. 25A to FIG. 25B, from FIG. 25C to FIG. 25D to FIG. 25E, and so on).

Accordingly, setting a second mode in which focusing is carried out only when a main subject is present in the scene, in addition to a first mode that focuses on the main subject in the case where the main subject is present in the scene and focuses on a subject in the center of the scene in the case where the main subject is not present in the scene, can be considered. However, in the second mode, if multiple subjects are present in the scene, and if the main subject exits the frame and the main subject is then switched to another subject that is then focused on, the focal plane will move and ultimately result in an image that is difficult to cut during editing.

Furthermore, in the focus adjustment disclosed in Patent Document 1, a case in which a moving picture is shot is taken into particular consideration, and as shown in FIG. 23, a sub AF area is set for the entire scene and the focus state signals obtained from the main and sub AF areas are added together at a predetermined ratio and used. This is done in an attempt to maintain a stable state of focus.

However, generally speaking, the faces of people have low contrast, which makes it difficult to obtain a suitable focus state signal, and thus even if the AF areas are set in the manner disclosed in Patent Document 1, there are cases where the face cannot be focused on due to the influence of background contrast components. For example, the example shown in FIG. 23 results in a focus state signal such as that shown in FIG. 24, and thus when a subject B in the background is in focus, the focal plane cannot be moved to a main subject A.

SUMMARY OF THE INVENTION

Having been achieved in light of the aforementioned problems, the present invention enables, in an AF process for detecting a desired subject and focusing on that subject, stable focus adjustment on a subject intended by a shooter.

According to the present invention, provided is a focus adjustment apparatus comprising: a detection unit that detects a subject/subjects having a predetermined characteristic from an image obtained while shooting a moving picture; a selection unit that, in the case where a subject/subjects having the predetermined characteristic have been detected by the detection unit, selects, from the detected subject/subjects, a subject that also fulfils a predetermined condition; and a focus adjustment unit that controls a focus lens to focus on the subject selected by the selection unit, wherein the focus adjustment unit does not control the focus lens in the case where no subject having the predetermined characteristic has been detected by the detection unit.

Further, according to the present invention, provided is a focus adjustment method comprising the steps of: detecting a subject/subjects having a predetermined characteristic from an image obtained while shooting a moving picture; selecting, in the case where a subject/subjects having the predetermined characteristic have been detected in the detecting step, from the detected subject/subjects, a subject that also fulfils a predetermined condition; and controlling a focus lens to focus on the subject selected in the selecting step, wherein in the controlling step, the focus lens is not controlled in the case where a subject having the predetermined characteristic has not been detected in the detecting step.

Furthermore, according to the present invention, provided is an image capturing apparatus comprising: an image sensor that generates a video signal by performing photoelectric conversion on a subject image that has entered through an imaging optical system; a subject detection unit that detects a subject/subjects in a sensed image from the video signal generated by the image sensor; a main subject selection unit that selects a main subject from the subject/subjects detected by the subject detection unit; a focus detection unit that detects a focus state of the main subject selected by the main subject selection unit or a focus state of a predetermined subject in the sensed image in the case where the main subject does not exist in the sensed image; a focus adjustment unit that executes a focus adjustment operation based on the focus state detected by the focus detection unit; a mode switching unit that switches between a first focus adjustment mode that executes the focus adjustment operation regardless of whether or not the main subject exists and a second focus adjustment mode that executes the focus adjustment operation only in the case where the main subject exists; a determination unit that determines whether or not the main subject exists in the sensed image or whether or not the main subject has changed; and a control unit that, in the second focus adjustment mode, prohibits the focus adjustment operation in the case where the determination unit has determined that the main subject does not exist in the sensed image or that the main subject has changed.

Furthermore, according to the present invention, provided is an image capturing apparatus comprising: an image sensor that generates a video signal by performing photoelectric conversion on a subject image that has entered through an imaging optical system containing a focus lens; a subject detection unit that detects a subject/subjects in a sensed image from the video signal generated by the image sensor; a main subject selection unit that selects a main subject from the subject/subjects detected by the subject detection unit; a focus detection unit that detects a focus state of the main subject selected by the main subject selection unit or a focus state of a predetermined subject in the sensed image in the case where the main subject does not exist in the sensed image; a focus adjustment unit that executes a focus adjustment operation based on the focus state detected by the focus detection unit; a mode switching unit that switches between a first focus adjustment mode that executes the focus adjustment operation regardless of whether or not the main subject exists and a second focus adjustment mode that executes the focus adjustment operation only in the case where the main subject exists; a determination unit that determines whether or not the main subject exists in the sensed image or whether or not the main subject has changed; and a control unit that controls to make a movement amount of the focus lens in the first focus adjustment mode larger than a movement amount in the second focus adjustment mode in the case where the determination unit has determined that the main subject does not exist in the sensed image or that the main subject has changed.

Further, according to the present invention, provided is a control method for an image capturing apparatus including an image sensor that generates a video signal by performing photoelectric conversion on a subject image that has entered through an imaging optical system, the method comprising the steps of: detecting a subject/subjects in a sensed image from the video signal generated by the image sensor; selecting a main subject from the subject/subjects detected in the detecting step; detecting a focus state of the main subject selected in the selecting step or a focus state of a predetermined subject in the sensed image in the case where the main subject does not exist in the sensed image; executing a focus adjustment operation based on the focus state detected in the detecting step of the focus state; switching between a first focus adjustment mode that executes the focus adjustment operation regardless of whether or not the main subject exists and a second focus adjustment mode that executes the focus adjustment operation only in the case where the main subject exists; determining whether or not the main subject exists in the sensed image or whether or not the main subject has changed; and prohibiting, in the second focus adjustment mode, the focus adjustment operation in the case where it has been determined in the determining step that the main subject does not exist in the sensed image or that the main subject has changed.

Further, according to the present invention, provided is a control method for an image capturing apparatus including an image sensor that generates a video signal by performing photoelectric conversion on a subject image that has entered through an imaging optical system that has a focus lens, the method comprising the steps of: detecting a subject/subjects in a sensed image from the video signal generated by the image sensor; selecting a main subject from the subject/subjects detected in the detecting step; detecting a focus state of the main subject selected in the selecting step or a focus state of a predetermined subject in the sensed image in the case where the main subject does not exist in the sensed image; executing a focus adjustment operation based on the focus state detected in the detecting step of the focus state; switching between a first focus adjustment mode that executes the focus adjustment operation regardless of whether or not the main subject exists and a second focus adjustment mode that executes the focus adjustment operation only in the case where the main subject exists; determining whether or not the main subject exists in the sensed image or whether or not the main subject has changed; and controlling to make a movement amount of the focus lens in the first focus adjustment mode larger than a movement amount in the second focus adjustment mode in the case where it has been determined in the determining step that the main subject does not exist in the sensed image or that the main subject has changed.

Further, according to the present invention, provided is a focus adjustment apparatus comprising: an image sensor that captures a moving picture and outputs a video signal; a detection unit that detects a subject having a predetermined characteristic from the moving picture based on the video signal obtained from the image sensor; a selection unit that selects one of a plurality of focus adjustment modes; a first setting unit that, in the case where the subject has been detected, sets a first focus detection area in a region of the subject, and in the case where the subject has not been detected, sets the first focus detection area in a predetermined region; a second setting unit that sets a second focus detection area in a predetermined region that includes the first focus detection area; a calculation unit that calculates a first focus state signal indicating a focus state based on the video signal in the first focus detection area and calculates a second focus state signal indicating a focus state based on the video signal in the second focus detection area; a determination unit that determines an adding ratio between the first focus state signal and the second focus state signal based on the focus adjustment mode selected by the selection unit; a generating unit that generates a third focus state signal by combining the first focus state signal and the second focus state signal based on the adding ratio; and a focus adjustment unit that carries out focus adjustment control by moving a focus adjustment member so that the third focus state signal becomes a maximum, wherein the plurality of focus adjustment modes include a first focus adjustment mode that focuses on the subject in the case where the subject has been detected by the detection unit and focuses on a predetermined region in the moving picture in the case where the subject has not been detected and a second focus adjustment mode that focuses on the subject in the case where the subject has been detected by the detection unit and does not carry out focus adjustment control using the focus adjustment unit in the case where the subject has not been detected, and the determination unit sets the adding ratio to be lower in the case where the second focus adjustment mode is selected than in the case where the first focus adjustment mode is selected.

Further, according to the present invention, provided is a focus adjustment method comprising the steps of: capturing a moving picture and outputting a video signal; detecting a subject having a predetermined characteristic from the moving picture based on the video signal obtained in the capturing step; selecting one of a plurality of focus adjustment modes; setting, in the case where the subject has been detected, a first focus detection area in a region of the subject, and in the case where the subject has not been detected, setting the first focus detection area in a predetermined region; setting a second focus detection area in a predetermined region that includes the first focus detection area; calculating a first focus state signal indicating a focus state based on the video signal in the first focus detection area and calculating a second focus state signal indicating a focus state based on the video signal in the second focus detection area; determining an adding ratio between the first focus state signal and the second focus state signal based on the focus adjustment mode selected in the selecting step; generating a third focus state signal by combining the first focus state signal and the second focus state signal based on the adding ratio; and adjusting the focus by moving a focus adjustment member so that the third focus state signal becomes a maximum, wherein the plurality of focus adjustment modes include a first focus adjustment mode that focuses on the subject in the case where the subject has been detected in the detecting step and focuses on a predetermined region in the moving picture in the case where the subject has not been detected and a second focus adjustment mode that focuses on the subject in the case where the subject has been detected in the detecting step and does not carry out focus adjustment control in the case where the subject has not been detected, and in the determining, the adding ratio is set to be lower in the case where the second focus adjustment mode is selected than in the case where the first focus adjustment mode is selected.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A and 5B are diagrams illustrating examples of results of main face determination according to the second embodiment of the present invention;

FIG. 15 is a flowchart illustrating a face correlation determination process executed during the process shown in FIG. 14;

FIG. 16 is a diagram illustrating various operation details of first and second face detection AF modes;

DESCRIPTION OF THE EMBODIMENTS

Exemplary embodiments of the present invention will be described in detail in accordance with the accompanying drawings. It should be noted that the embodiments described hereinafter are merely exemplary. The embodiments may be modified as appropriate depending on the configuration of the apparatus, the various conditions, and so on to which the present invention is applied; the present invention is not intended to be limited to the embodiments described hereinafter. In addition, separate parts of the various embodiments described hereinafter may be combined as appropriate.

First Embodiment

Figure 1:
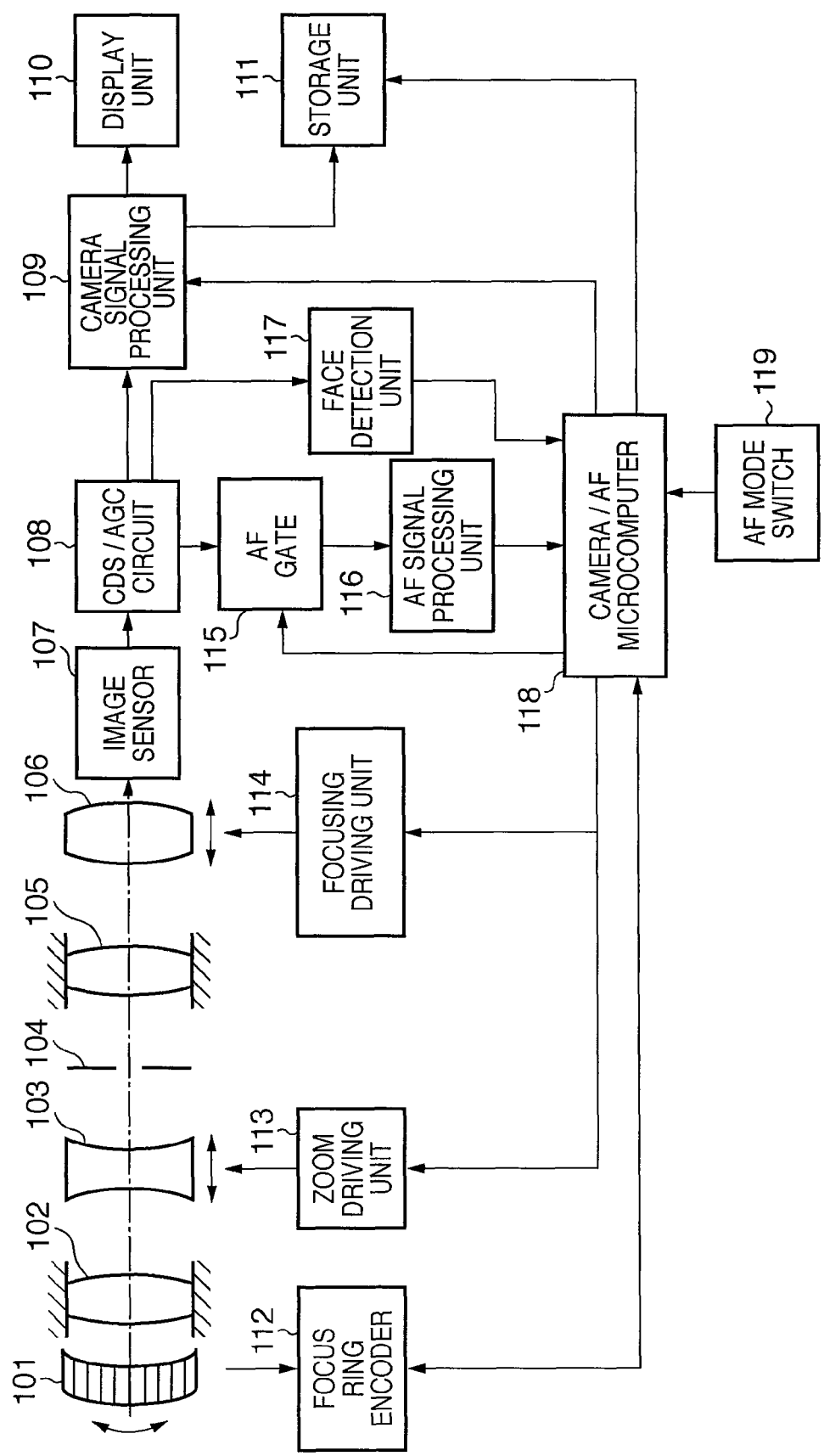
FIG. 1 is a block diagram illustrating the overall configuration of a video camera according to first and second embodiments of the present invention.

FIG. 1 is a block diagram illustrating the overall configuration of a video camera, serving as an example of an image capturing apparatus according to an embodiment of the present invention. Although a video camera is described in the first embodiment, it should be noted that the present invention can also be applied in other image capturing apparatuses that are capable of shooting moving pictures, such as digital still cameras or the like.

In FIG. 1, 101 indicates a focus ring, 102 indicates a first fixed lens, 103 indicates a zoom lens that carries out zooming by moving in the direction of the optical axis, and 104 indicates a diaphragm. Furthermore, 105 indicates a second fixed lens, and 106 indicates a focus compensator lens that provides both a function for compensating for the movement of the focal plane caused by zooming and a function for focusing (this will be called a "focus lens" hereinafter). An optical imaging system is configured by the first fixed lens 102, the zoom lens 103, the diaphragm 104, the second fixed lens 105, and the focus lens 106.

107 indicates an image sensor serving as photoelectric conversion sensor, such as a CCD sensor, a CMOS sensor, or the like, whereas 108 indicates a CDS/AGC circuit that samples the output of the image sensor 107 and adjusts the gain thereof.

109 indicates a camera signal processing unit that generates a video signal by carrying out various types of image processes on a signal output from the CDS/AGC circuit 108. In addition, the camera signal processing unit 109 includes a character generator that superimposes text, marks, or the like upon a scene under the control of a camera/AF microcomputer 118, which will be mentioned later. 110 indicates a display unit, configured of an LCD or the like, that displays video signals, text, marks, and so on from the camera signal processing unit 109. 111 indicates a storage unit that records video signals from the camera signal processing unit 109 onto a recording medium such as magnetic tape, an optical disc, a semiconductor memory, or the like.

112 indicates a focus ring encoder for detecting the rotation of the focus ring 101, whereas 113 indicates a zoom driving unit for moving the zoom lens 103. 114 indicates a focusing driving unit for moving the focus lens 106. The zoom driving unit 113 and the focusing driving unit 114 are configured of actuators such as stepping motors, DC motors, vibrating motors, voice coil motors, and so on.

115 indicates an AF gate that, of the image signals of all of the pixels from the CDS/AGC circuit 108, allows only signals in a region that is within an AF frame, set by the camera/AF microcomputer 118 in the manner described later and used in focus detection, to pass. An AF signal processing unit 116 generates an AF evaluation value signal by extracting a high-frequency component, a luminosity component (that is, the difference between a maximum value and a minimum value for the luminosity level of a signal that has passed through the AF gate 115), and so on from the image signals that have passed through the AF gate 115, and outputs the AF evaluation value signal to the camera/AF microcomputer 118. As the AF evaluation value signal expresses the level of sharpness (the contrast state) of a video generated based on the signal output from the image sensor 107, and the level of sharpness changes depending on the focus state of the optical imaging system, thus the AF evaluation value signal is ultimately a signal that expresses the focus state of the optical imaging system.

A face detection unit 117 carries out a known face detection process on the signal output from the CDS/AGC circuit 108, and detects the facial region of a person in a shot scene. The result of the detection is sent to the camera/AF microcomputer 118. There is, as a face detection process, a method that detects a face by extracting a skin tone region from the tones in the pixels that express image data and employing a degree of matching with a face contour template prepared in advance. In addition, a method that carries out face detection by extracting feature points of faces such as eyes, noses, mouths, and so on using a known pattern recognition technique has also been disclosed. Note that the method of the face detection process in the present invention is not limited to the methods described above, and any such method may be employed.

An AF mode switch 119 is a switch through which a shooter selects, as an AF mode, "normal AF", "face AF", or "face only AF". For example, if the AF mode switch 119 is a push-type switch, the AF modes can be cycled through, from "normal AF" to "face AF" to "face only AF" and then back to "normal AF", each time the switch is depressed. Note that the focus adjustment processes for the "normal AF", "face AF", and "face only AF" modes will be described later.

The camera/AF microcomputer 118 controls the operations of the video camera as a whole. One example of such control is setting the AF frame in the AF gate 115 based on the AF mode set by the AF mode switch 119 and the face detection result obtained by the face detection unit 117. In addition, the camera/AF microcomputer 118 moves the focus lens 106 by controlling the focusing driving unit 114 so that the AF evaluation value increases, based on the AF evaluation value signal output from the AF signal processing unit 116. In this manner, the camera/AF microcomputer 118 carries out focus control according to the TV-AF method (referred to as "TV-AF control" hereinafter). Note that because TV-AF control is a known technique, detailed descriptions thereof will not be given here. In addition, manual focus control (referred to as "MF control" hereinafter) is also carried out, moving the focus lens 106 based on the direction and amount of rotation by which the shooter manipulates the focus ring 101.

Next, AF control according to the first embodiment, carried out by the camera/AF microcomputer 118 of the video camera configured as described above, will be described with reference to FIG. 2. Note that this AF control is executed in accordance with a computer program stored within the camera/AF microcomputer 118.

After the process starts in step S201, it is determined, in step S202, whether "face AF" is selected as the AF mode by the AF mode switch 119. In the case where "face AF" is selected in step S202, the process advances to step S203, whereas in the case where "face AF" is not selected, the process advances to step S209.

In step S203, it is determined whether a face is currently detected. In the case where a face is detected in step S203, the process advances to step S204, whereas in the case where a face is not detected, the process advances to step S206. In the case where a single face has been detected, in step S204, that face is set as a primary face (referred to as a "main face" hereinafter), whereas in the case where multiple faces have been detected, a face that fulfills a predetermined condition is set as the main face, based on the positions, sizes, and so on of the respective faces. Note that various methods have been proposed in the past as methods for determining the main face, and any such method may be employed. In step S205, the AF frame is set in the AF gate 115 to the position in which the main face has been detected, and the process advances to step S207. On the other hand, in step S206, the AF frame is set in the AF gate 115 to a predetermined position in the scene, and the process advances to step S207.

In step S207, it is determined whether or not the focus ring 101 is being manipulated. In the case where the focus ring 101 is not being manipulated, the process advances to step S208, whereas in the case where the focus ring 101 is being manipulated, the process advances to step S216, where MF control is carried out. In step S208, the so-called TV-AF control is carried out, in which the focus lens 106 is moved and focusing is carried out so that the AF evaluation value increases, based on the AF evaluation value signal obtained from the image signal within the AF frame set in step S205 or step S206.

Meanwhile, if it has been determined in step S202 that the AF mode is not "face AF", it is determined in step S209 whether or not the AF mode is "face only AF". In the case where the "face only AF" has been determined in step S209, the process advances to step S210, whereas when the "face only AF" has not been determined in step S209, it is determined that the AF mode is "normal AF", and the process advances to the processes of step S206 and on, described above.

In step S210, it is determined whether or not a face is currently detected; in the case where a face is detected, the process advances to step S211, whereas in the case where a face is not detected, the process advances to step S215. In step S211, in the case where a single face is detected, that face is set as the main face, whereas in the case where multiple faces are detected, the main face is determined based on the positions, sizes, and so on of the respective faces, as in the aforementioned step S204. In step S212, the AF frame is set in the AF gate 115 to the position in which the main face has been detected, and the process advances to step S213.

In step S213, it is determined whether or not the focus ring 101 is being manipulated. In the case where the focus ring 101 is not being manipulated, the process advances to step S214, whereas in the case where the focus ring 101 is being manipulated, the process advances to step S215. In step S214, a "face AF indicator", which will be described later, is displayed, and the process moves to step S208. Then, in step S208, the so-called TV-AF control is carried out, in which the focus lens 106 is moved and focusing is carried out so that the AF evaluation value increases, based on the AF evaluation value signal obtained from the image signal within the AF frame set in step S212.

In the case where a face is not detected in step S210, and in the case where the focus lens is not being manipulated in step S213, a "no face AF indicator", which will be described later, is displayed in step S215, after which the process advances to step S216 and MF control is carried out.

FIG. 3A through FIG. 3E are diagrams illustrating examples of images obtained in the case where "face only AF" is selected in step S209. FIGS. 3A through 3E illustrate states of focus in the case where a subject enters and exits a scene that is being shot.

Figure 3A:
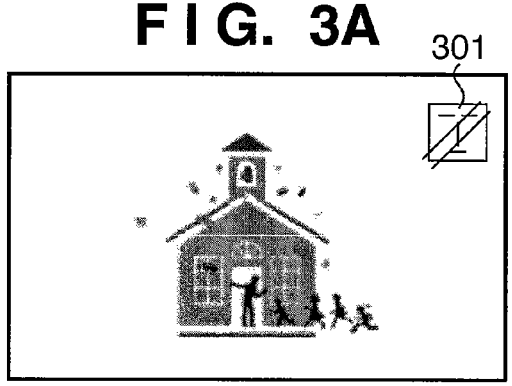
FIGS. 3A to 3E are diagrams illustrating an example of an image obtained through "face only AF" according to the present invention.
Figure 3D:
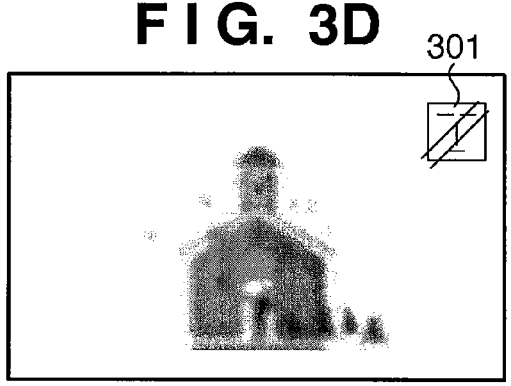
Figure 3B:
Figure 3E:
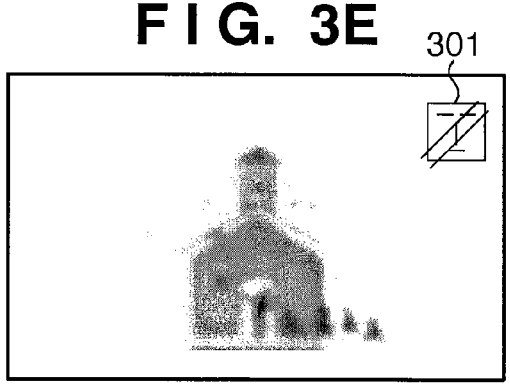
Figure 3C:
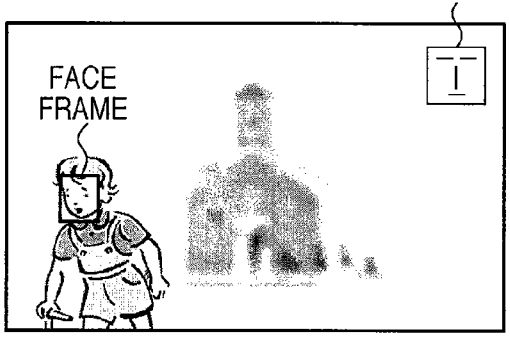

FIG. 3A illustrates a state occurring after the subject has exited the scene from the previous time, and because the focus state from the time when the subject left is still in effect, the background is blurry. At this time, a "no face AF indicator" 301 is displayed. FIG. 3B and FIG. 3C illustrate states in which the subject has entered into the scene and a face has been detected, and the face within a face frame is in focus and tracked while that face is being detected. At this time, the "face AF indicator" 302 is displayed. FIG. 3D and FIG. 3E, meanwhile, illustrate images obtained after the subject has exited the scene, where the focus state when the subject exited the scene (that is, the focus state shown in FIG. 3C) is maintained. The "no face AF indicator" 301 is displayed at this time, too.

Note that the "no face AF indicator" and the "face AF indicator" are not limited to the examples illustrated in FIG. 3A through FIG. 3E, and any indicators, such as a text display, audio notifications, or the like may be used as long as they can be recognized by the shooter. Or, these displays may not be carried out at all.

As described thus far, according to the first embodiment, when "face only AF" is active, AF control is carried out only while a face is being detected, and when a face is not being detected, the AF state used the previous time a face was detected is maintained, as long as the focus ring 101 is not being manipulated. Through this, when the subject exits the scene, the state of focus at the time when the subject exited the scene can be maintained, which makes it possible to obtain editing cut points at times when there is no movement in the image.

Furthermore, by displaying the "no face AF indicator" and the "face AF indicator", during "face only AF", it is possible to be aware, at a glance, that AF control is not being carried out while a face is not being recognized.

Note that because "face only AF" is a function used only in certain situations, it is preferable for the shooter to be able to switch from "normal AF" to "face AF" to "face only AF" and back to "normal AF" quickly, such as by using a switch on the camera body, a display on the standby screen of a touch panel, or the like. Furthermore, during "face only AF", MF control is carried out when a face is not detected, and thus the focus lens 106 is moved immediately when the focus ring 101 has been manipulated.

Second Embodiment

Next, a second embodiment of the present invention will be described.

In the aforementioned first embodiment, the main face determination carried out in step S204 during "face AF" and the main face determination carried out in step S211 during "face only AF" are described as being the same process. As opposed to this, in the second embodiment, the main face determination during "face AF" and the main face determination during "face only AF" carry out different processes. The second embodiment is the same as the first embodiment in all other respects, and therefore descriptions thereof will be omitted.

Figure 2:
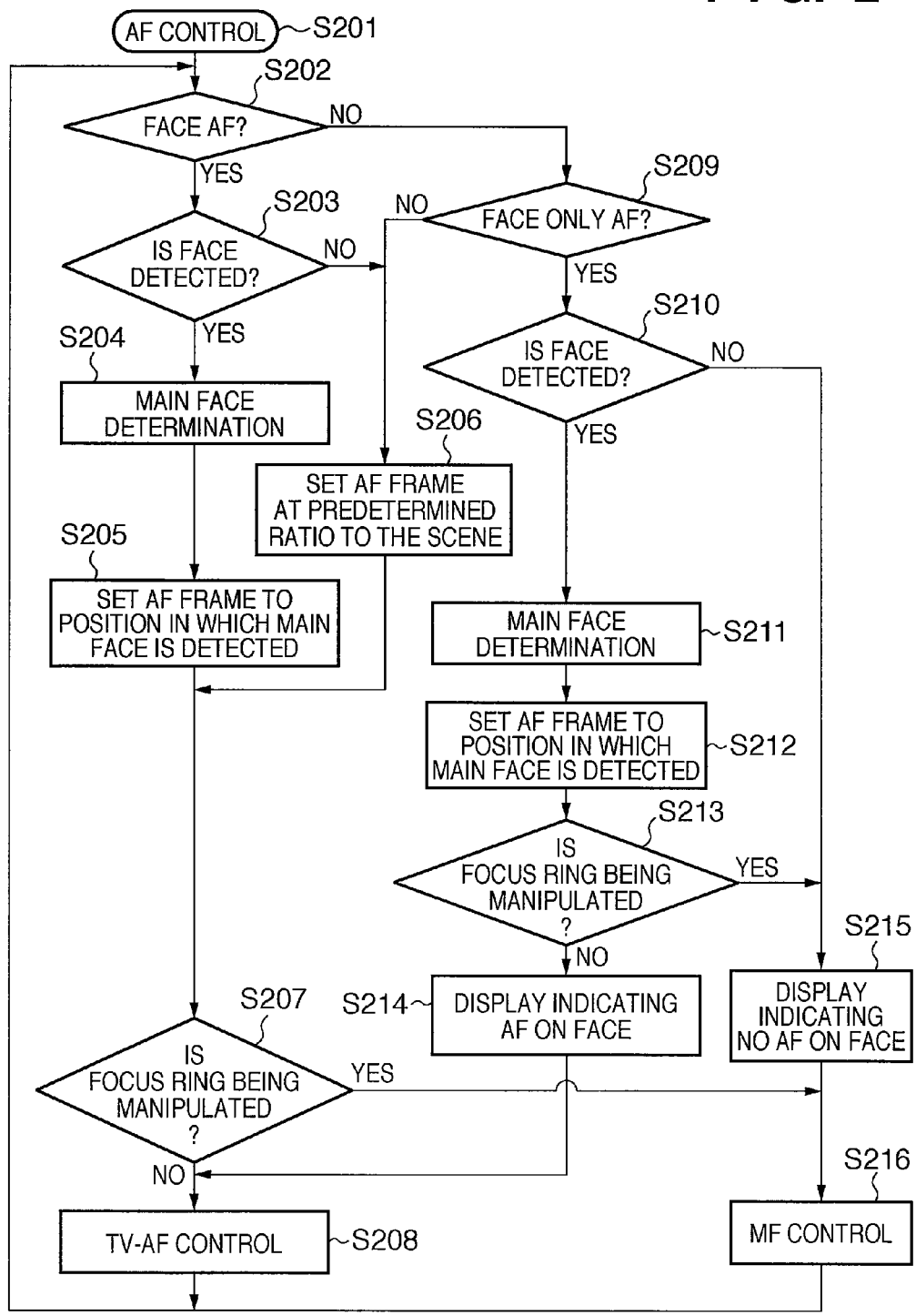
FIG. 2 is a flowchart illustrating a focus adjustment control process according to the first embodiment of the present invention.
Figure 4A:
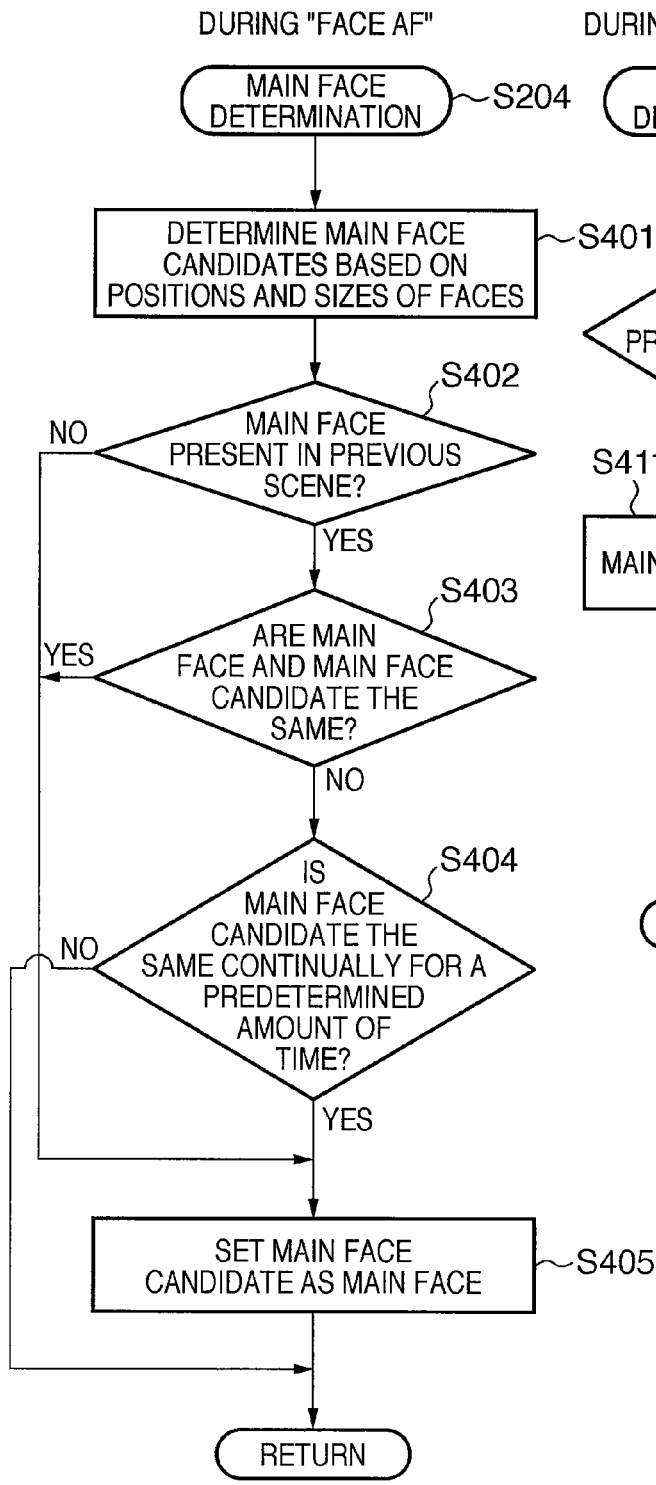
FIGS. 4A and 4B are flow charts illustrating a main face determination process according to the second embodiment of the present invention.
Figure 4B:
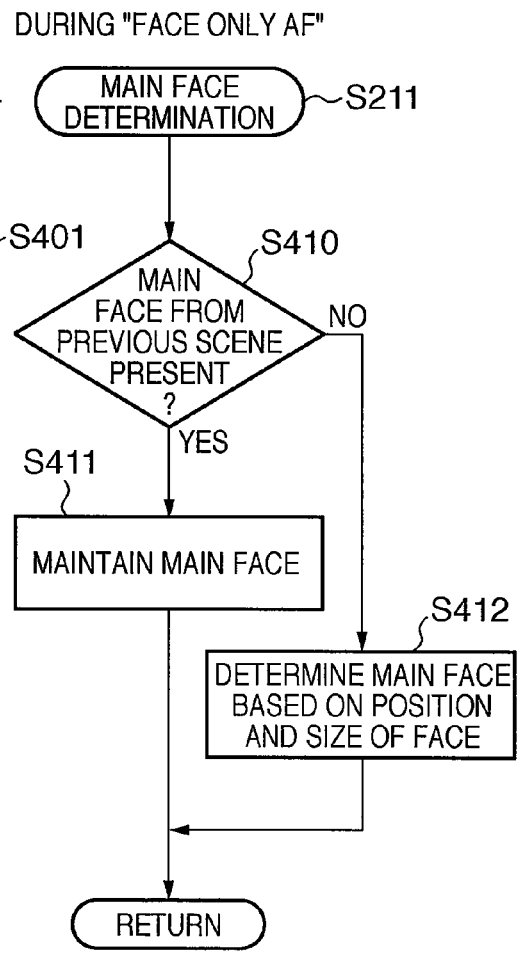

FIG. 4A illustrates a main face determination process in the case where multiple faces are detected during the "face AF" carried out in step S204 of FIG. 2, whereas FIG. 4B illustrates a main face determination process in the case where multiple faces are detected during the "face only AF" carried out in step S211 of FIG. 2.

First, the processing performed in FIG. 4A will be described. When the processing is commenced, in step S401, a main face candidate in the scene is determined based on the positions and sizes of the multiple faces that have been detected. In step S402, it is determined whether the main face is present in the previous scene. If the main face is present, the process advances to step S403; whereas, if the main face is not present, the process advances to step S404, where the current main face candidate is determined as the main face, after which the process ends.

Meanwhile, in step S403, it is determined whether the main face from the previous scene and the current main face candidate are the same face, based on the position, size, and so on. In the case where it has been determined in step S403 that the two faces are the same face, the current main face candidate is determined as the main face, and the process ends. However, in the case where it has been determined in step S403 that the two faces are not the same face, the process advances to step S404, where it is determined whether the main face candidate is the same for a predetermined continuous amount of time. In the case where it has been determined in step S404 that the main face candidate is the same for the predetermined continuous amount of time, the process advances to step S405, where the current main face candidate is newly set as the main face. In the case where it has been determined in step S404 that the main face candidate is not the same for the predetermined continuous amount of time, the main face is held over from the previous scene, and the process ends.

In this manner, during "face AF", the face that is most appropriate as the main face is continually selected based on the position and size thereof within the scene, and AF control is carried out on that face.

Next, the process in FIG. 4B will be described. When the process is commenced, in step S410, it is determined whether the main face from the previous scene is still present. In the case where the main face is still present, the process advances to step S411, where the current main face is held over, and the process ends. However, in the case where the main face is no longer present, the process advances to step S412, where the main face is determined based on the positions, sizes, and so on of the multiple detected faces; after this, the process ends.

The aforementioned process will be described further with reference to FIGS. 5A and 5B. FIG. 5A illustrates a state occurring during "face AF"; here, B is first detected as the main face, but thereafter, when A appears and a state in which A has been determined to be a main face candidate based on the position, size, and so on, continues for a predetermined amount of time, the main face is reset to A. In this manner, with "face AF", the face that is most appropriate as the main face at that time is selected as the main face.

On the other hand, FIG. 5B illustrates a state occurring during "face only AF"; here, like FIG. 5A, B is first detected as the main face, and A then appears thereafter. During "face only AF", the main face is not changed as long as a face that was once detected as the main face remains, and thus the focus is kept on the subject that was originally determined as the main face.

As described thus far, according to the second embodiment, it is possible to keep, with certainty, the focus on a face that was once detected during "face only AF", in addition to the effects achieved by the aforementioned first embodiment.

Third Embodiment

Figure 6:
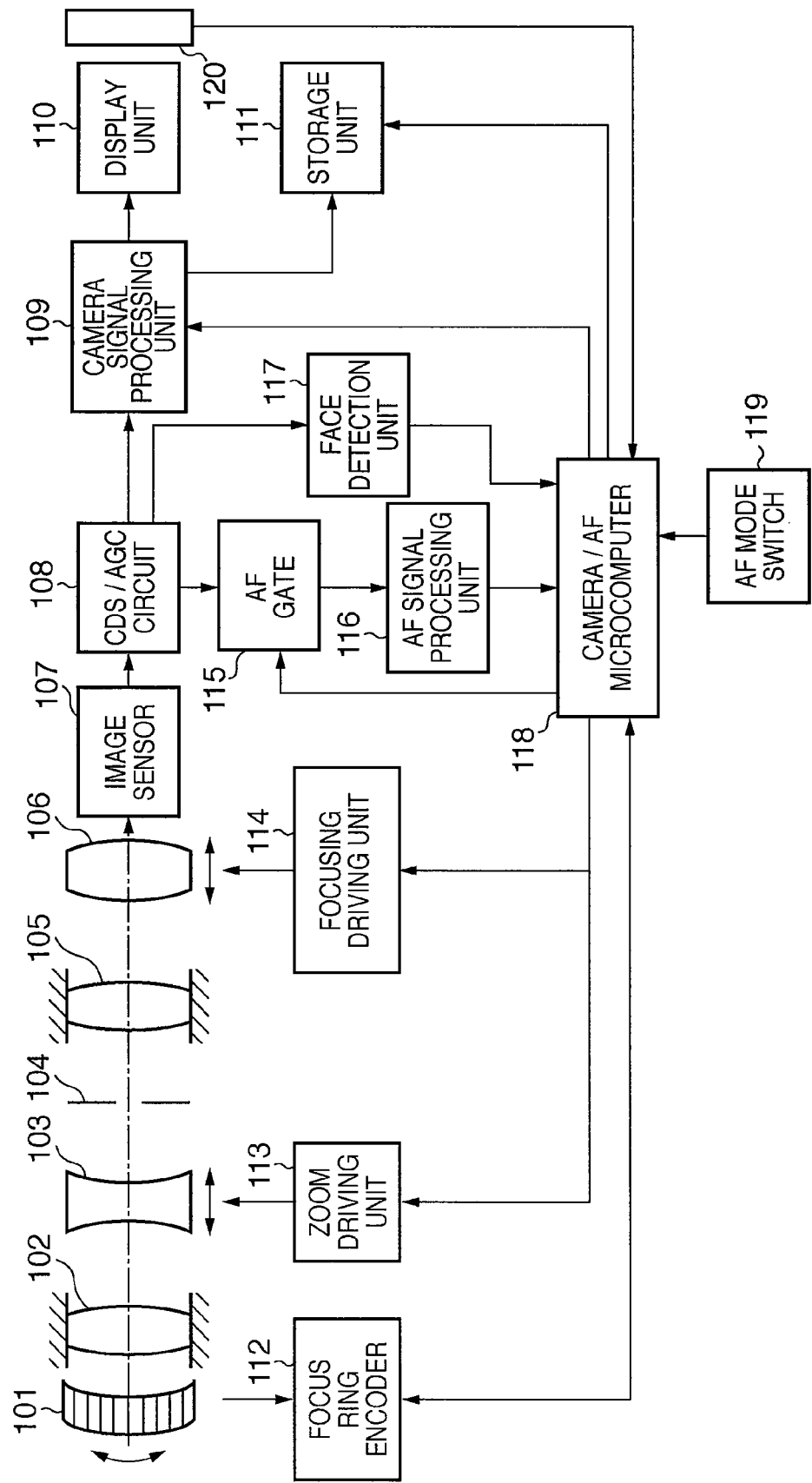
FIG. 6 is a block diagram illustrating the overall configuration of a video camera according to a third embodiment of the present invention.

Next, a third embodiment of the present invention will be described. FIG. 6 is a block diagram illustrating the overall configuration of a video camera, serving as an example of an image capturing apparatus according to the third embodiment of the present invention. Note that the differences with the configuration illustrated in FIG. 1 are that a touch panel 120 has been further added to the configuration illustrated in FIG. 1, and that the shooter can determine a position within the scene. The output of the touch panel 120 is input into the camera/AF microcomputer 118.

Figure 7:
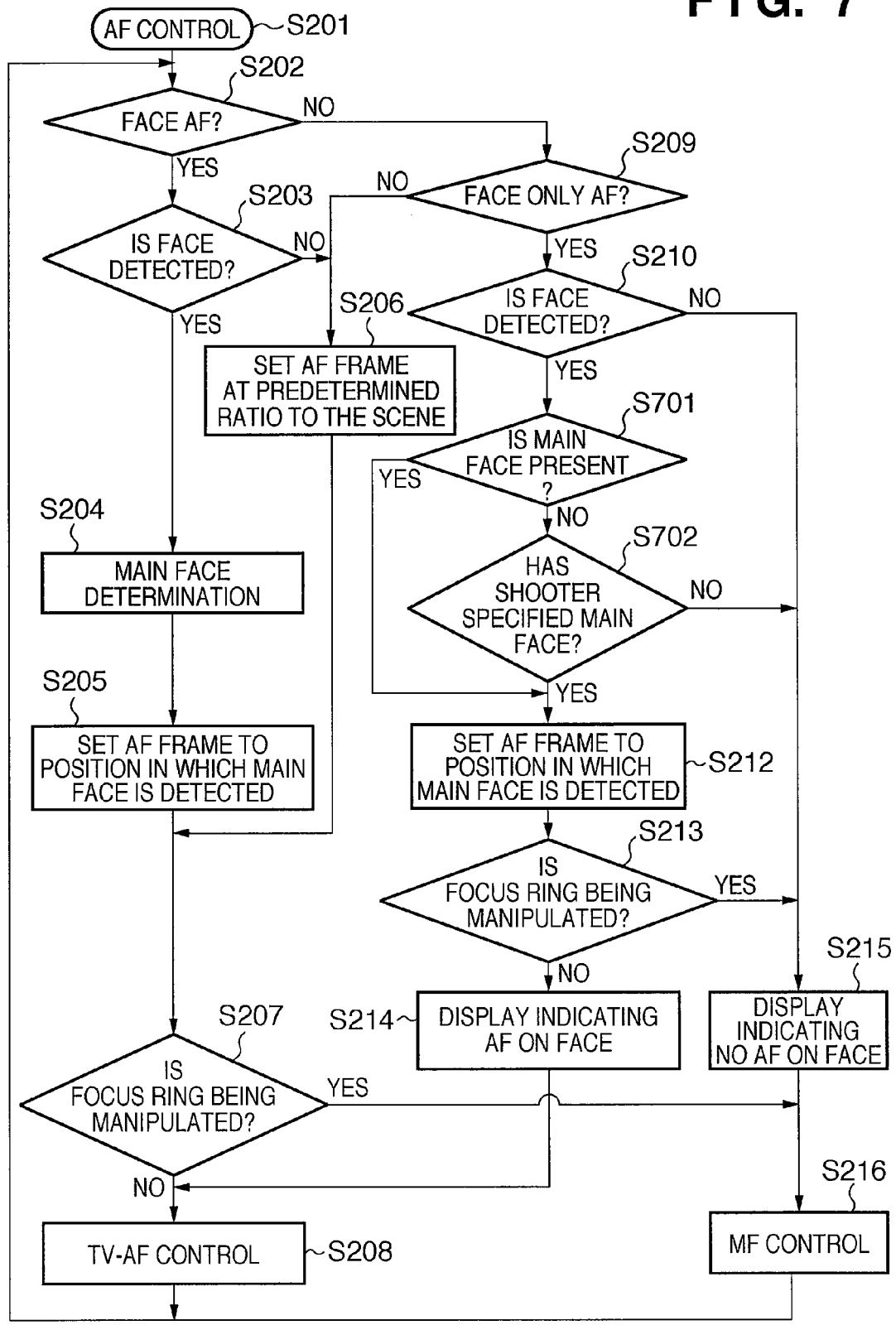
FIG. 7 is a flowchart illustrating a focus adjustment control process according to the third embodiment of the present invention.

Next, AF control carried out by the camera/AF microcomputer 118 in the present third embodiment will be described using FIG. 7. Note that this AF control is executed in accordance with a computer program stored within the camera/AF microcomputer 118. Furthermore, the process illustrated in FIG. 7 differs from the process illustrated in FIG. 2 and described in the first embodiment in that the processes of steps S701 and S702 are carried out instead of the main face determination that is carried out in step S211. Accordingly, processes that are the same as those illustrated in FIG. 2 are given the same reference numerals, and descriptions thereof are omitted.

In the case where "face only AF" is selected (YES in step S209) and it has been determined that a face is detected (YES in step S210), the process advances to step S701, where it is determined whether a main face has already been selected and whether that main face is still present. In the case where it has been determined in step S701 that a main face is present, the process advances to step S212. On the other hand, in the case where it has been determined in step S701 that a main face is not present, the process advances to step S702, where it is checked whether the shooter has specified a main face. Here, in the case where position information has been input through the touch panel 120 and the face is present in that position, it is determined that the shooter has specified a main face, and the process advances to step S212.

As described thus far, according to the present third embodiment, even if a face is detected, AF is not carried out until the shooter has specified a main face if no main face was present up until that time; once, however, a main face has been specified, AF is commenced on the specified main face. Through this, it is possible to continue to focus on the main face that is desired by the shooter with more certainty, in addition to the effects described in the aforementioned first embodiment.

Although the aforementioned third embodiment describes a case in which the main face is specified through an input made using the touch panel 120, it goes without saying that an input unit aside from a touch panel may be employed instead.

Furthermore, although the aforementioned first through third embodiments describe cases in which a face is detected and the detected face is focused on, the present invention is not limited to faces; a subject having predetermined characteristics, such as a pet, a car, or the like, may be detected and focused on instead.

Fourth Embodiment

Next, a fourth embodiment of the present invention will be described.

First, the main configuration of a video camera according to the present fourth embodiment will be described with reference to FIG. 8. Note that elements that are the same as those illustrated in FIG. 1 are given the same reference numerals, and descriptions thereof are omitted.

Figure 8:
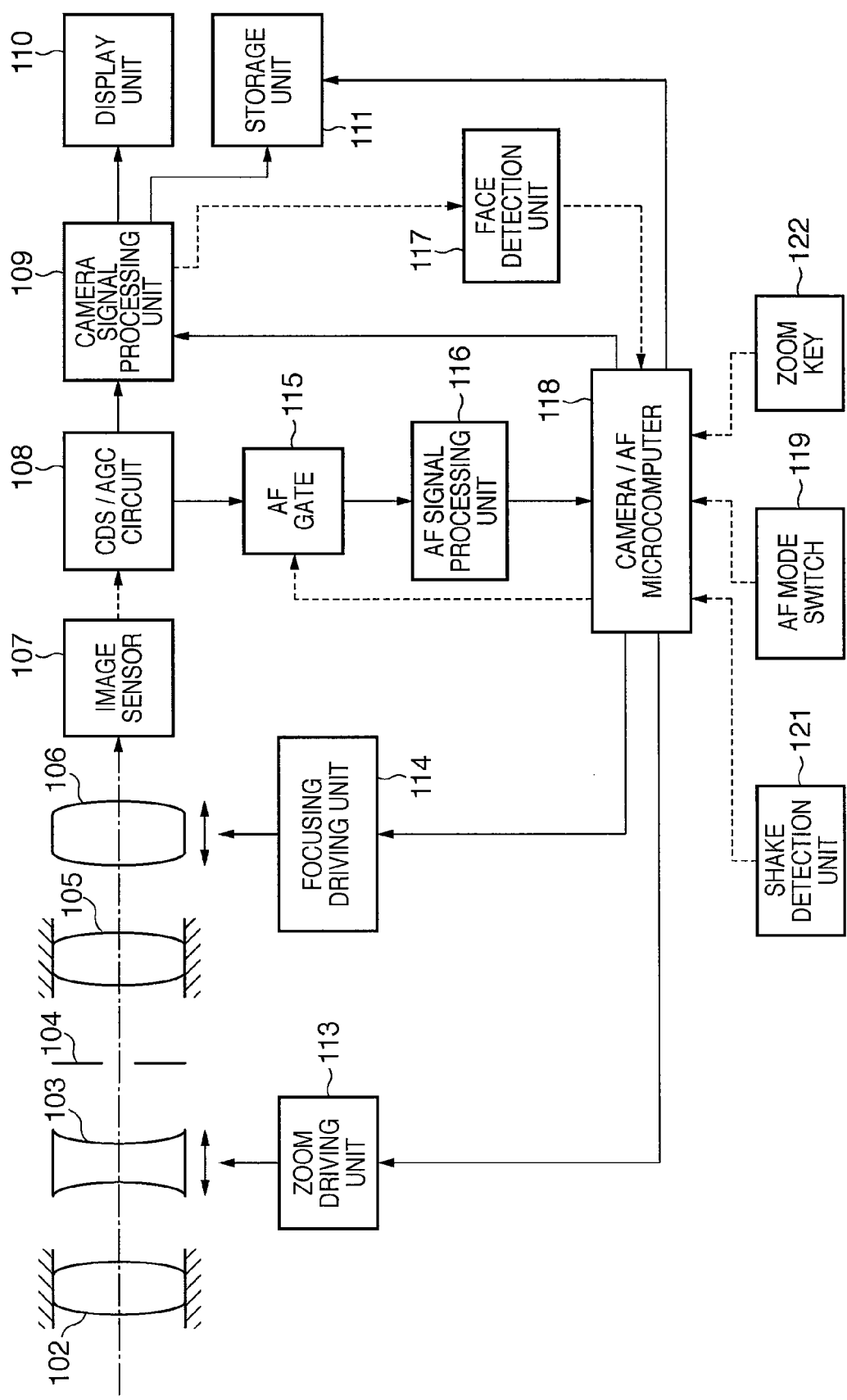
FIG. 8 is a block diagram illustrating the primary configuration of an image capturing apparatus according to a fourth embodiment of the present invention.

The configuration of the video camera illustrated in FIG. 8 differs from that illustrated in FIG. 1 in that the focus ring 101 and the focus ring encoder 112 have been removed, and a zoom key 122 and a shake detection unit 121 have been added. Note that in the fourth embodiment, the AF mode switch 119 includes a function for switching the AF control using a face detection process that will be mentioned later; in addition, the camera/AF microcomputer 118 carries out AF control and AE control based on the result of the face detection process, in accordance with the face detection AF mode selected by the shooter.

The shooter can manipulate a zoom key 122, and the zoom lens 103 moves as a result of the camera/AF microcomputer 118 controlling the zoom driving unit 113 in correspondence with the manipulation of the zoom key 122; through this, the zoom ratio can be changed.

The shake detection unit 121 is a unit that detects shake of the video camera occurring when shooting using the video camera, and employs an angular velocity sensor such as a gyrosensor or the like. The output of the shake detection unit 121 is input into the camera/AF microcomputer 118 as a shake signal, and after being subjected to a predetermined filtering process and an integration process, is employed as a control signal for an image stabilization system (not shown) indicating the angular displacement of the video camera.

As an image stabilization system, there is an optical technique that places a prism, a lens member, or the like capable of optical axis deflection in the optical path of the imaging light that enters into the image sensor and deflects the optical axis in accordance with instability. There is also an electronic technique that stabilizes images by controlling a position from which to cut out part of an image obtained by the image sensor and cutting out the image from the position obtained through the control. These techniques are often combined with a motion vector detection technique that calculates the amount of motion of the camera based on changes in the video signal between fields and uses the calculated amount of motion as the shake amount. In this case, correction is carried out by extracting accumulated images from a frame memory used for motion vector detection so as to eliminate motion in those accumulated images.

Next, an AF control process according to the fourth embodiment, executed by the camera/AF microcomputer 118, will be described with reference to FIG. 9. The AF control process shown in FIG. 9 is executed in accordance with a computer program stored within the camera/AF microcomputer 118, and is, for example, repeatedly executed with each cycle in which an imaging signal is read out from the image sensor 107 in order to generate a single field image.

Figure 9:
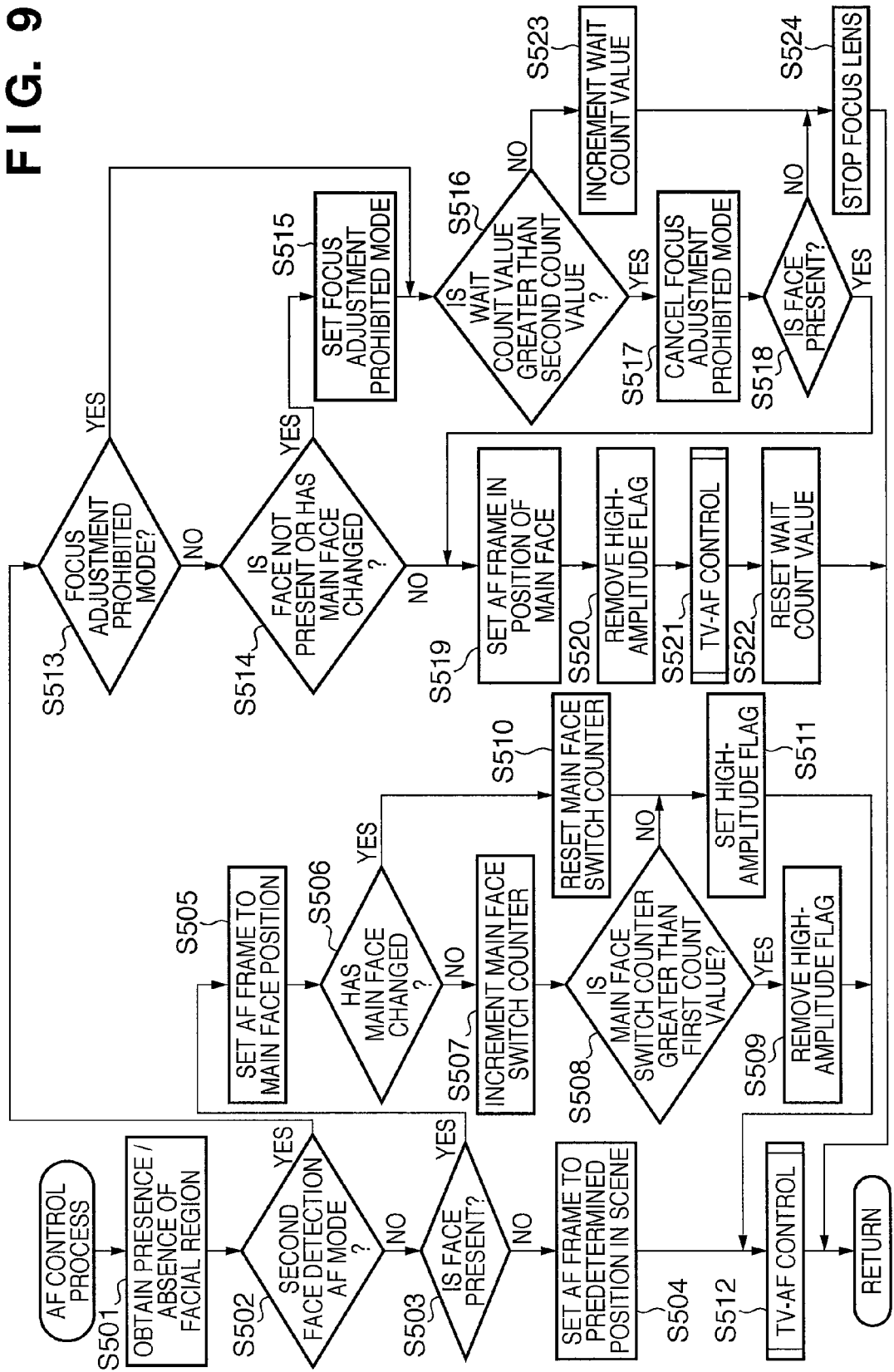
FIG. 9 is a flowchart illustrating an AF control process according to the fourth embodiment.

In FIG. 9, first, after a face detection process has been executed on the latest video signal, information indicating the presence/absence of a facial region is obtained from the face detection unit 117 (step S501).

Next, in step S502, the face detection AF mode selected by the shooter using the AF mode switch 119 is obtained.

In the fourth embodiment, one of the two face detection AF modes illustrated in FIG. 16 can be selected as the face detection AF mode. In the first face detection AF mode, in the case where a face is present within the shot scene, that face is focused on, whereas in the case where a face is not present in the scene, the subject in the center of the scene is focused on all the time. In the second face detection AF mode, it is only when a face is present in the shot scene that the face is focused on. In other words, in the first face detection AF mode, in the case where a face is present, the face is tracked and focused upon, whereas in the case where no face is present, the center of the scene is focused on; this makes it possible to quickly focus on any of the subjects in the scene at any given time. Meanwhile, in the second face detection AF mode, it is only when a face is present in the shot scene that the face is tracked and brought into focus in a stable manner, whereas focusing is prohibited in the case where no face is present. Through this, a situation in which the background is quickly brought into focus when the face has exited the frame, resulting in a video in which the focal plane moves and is thus difficult to cut during editing, can be prevented. In this manner, by providing the first and second face detection AF modes that are suited to the intentions of the shooter and allowing the shooter to select the mode according to the scene to be shot his/herself, it is possible to provide the shooter with the optimal AF control.

Here, it is determined whether the face detection AF mode is the second face detection AF mode, and the process advances to step S503 in the case where the face detection AF mode is not the second face detection AF mode; whereas, if the face detection AF mode is the second face detection AF mode, the process advances to step S513.

In step S503, it is determined whether or not a facial region is present based on the result obtained in step S501. In the case where no facial region is present, the process advances to step S504, where an AF frame is set in the center position of the scene; then, in step S512, TV-AF control, which will be mentioned later, is carried out. On the other hand, in the case where a facial region is present, the process advances to step S505, where the AF frame is set to a main face position specified by a main face determination processing unit within the camera/AF microcomputer 118, mentioned later.

Next, in step S506, it is determined whether or not the current main face has changed from the previous main face. In the case where the main face has not changed, the process advances to step S507, whereas in the case where the main face has changed, the process advances to step S510. Here, whether or not the main face has changed is determined based on whether or not a face number assigned to the main face when the main face has been specified by the main face determination processing unit (mentioned later) is changed.

In step S507, a main face switch counter is incremented. The process then advances to step S508, where it is determined whether or not the main face switch counter is greater than a first count value. In the case where the counter is equal to or less than the first count value, the process advances to step S511, where a high-amplitude flag is set. On the other hand, in the case where the counter is greater than the first count value, the high-amplitude flag is cleared. Here, the first count value is, for example, one second.

In step S510, the main face switch counter is reset due to the main face changing, and in step S511, the high-amplitude flag is set.

Here, with respect to the setting and removal of the high-amplitude flag, in the case where the high-amplitude flag has been set, the amplitude amount by which the focus lens 106 is moved during minute driving in a TV-AF process in step S511, mentioned later, is increased. For example, the amplitude amount is set to double of the amplitude amount set in the case where the high-amplitude flag is removed.

In the fourth embodiment, increasing the amplitude amount during minute driving in the case where the main face has changed is carried out in order to quickly focus on the main face. In other words, if the next main face is out of focus, it is difficult to determine which direction to move the focus lens 106 in, which results in longer times taken to focus. For this reason, increasing the amplitude amount makes it easier to determine the direction in which to move the focus lens 106, which reduces the amount of time it takes to focus on the next main face. However, if the amplitude is increased after the scene is in focus, subjects that have been defocused due to the movement of the focus lens 106 become difficult to see. Therefore, the first count value can be set to the amount of time it generally takes to focus, or can be set by estimating the amount of time the main face will be significantly blurred.

Next, the process advances to step S513 in the case where the second face detection AF mode has been set in step S502. Here, it is determined whether or not a focus detection prohibited mode, which will be mentioned later, is in effect. In the case where the focus detection prohibited mode is in effect, the process advances to step S516, whereas in the case where the focus detection prohibited mode is not in effect, the process advances to step S514.

In step S514, it is determined whether or not a facial region is present, or whether or not the main face has changed, based on the result obtained in step S501, as in steps S503 and S506. In the case where the facial region is not present or the main face has changed, the process advances to step S515, where the focus detection prohibited mode is set. However, in the case where the facial region is present and the main face has not changed, the process advances to step S519. Here, the "focus detection prohibited mode" refers to a mode in which the facial region is present but AF control is prohibited; the focus detection prohibited mode is canceled in response to a predetermined condition, as will be mentioned later, after which AF control is carried out.

In step S516, it is determined whether or not a waiting count value is greater than a second count value. In the case where the waiting count value is equal to or less than the second count value, the process advances to step S523, where the waiting count value is incremented; then, in step S524, the focus lens 106 is stopped. However, in the case where the waiting count value is greater than the second count value, the process advances to step S517, where the focus detection prohibited mode is canceled; the process then advances to step S518.

In step S518, it is determined whether or not the facial region is present; in the case where the facial region is not present, the process advances to step S524, where the focus lens 106 is stopped. On the other hand, in step S514, in the case where the facial region is present and the main face has not changed, the process advances to step S519, where the AF frame is set in the main face position, as in step S505.

Next, in step S520, the high-amplitude flag is removed; in step S521, the same TV-AF control as that in step S512 is carried out; and in step S522, the waiting count value is reset.

In the fourth embodiment, the focus detection prohibited mode is set when the main face has changed, and the focus lens 106 is stopped for a predetermined amount of time. This is because in the case where another face is not present in the background when the main face has exited the frame, if the next main face is quickly focused on as in the first face detection AF mode, a video that is difficult to cut during editing will result due to the focal plane moving. This makes it impossible to take advantage of the second face detection AF mode, and results in a video that is difficult to edit, which goes against the intentions of the shooter. In other words, with the second face detection AF mode, it is desirable, in the case where a main subject on which AF control is to be carried out is present, to continue to focus on that main subject, and desirable, in the case where the main subject is no longer present, to keep the background and so on blurry, without moving the focal plane. Despite the second face detection AF mode aiming at enabling the shooting of a shot scene in which the video is easy to edit and providing a shot scene that is stable and matches the intentions of the shooter, quickly moving the focal plane because another subject goes against the intentions of the shooter and thus imparts a sense of displeasure.

Furthermore, in the present fourth embodiment, the waiting count value is incremented even in the case where a facial region is not present. Although another facial region was not present immediately after the initial facial region was no longer present, a new facial region may appear before the second count value, until which the focal plane is to be stopped, has been reached. The waiting count value is incremented in such cases in order to prevent the focal plane from moving. Furthermore, because it is acceptable for the second count value to be set so as to secure an amount of time that can be cut during editing as mentioned above, the second count value may be set to a count value that continues endlessly, so that the focal plane does not move at all. In the case of a count value that continues endlessly, the waiting count value may be reset in the case where the face detection AF mode has changed to a mode aside from the second face detection AF mode.

Figure 10:
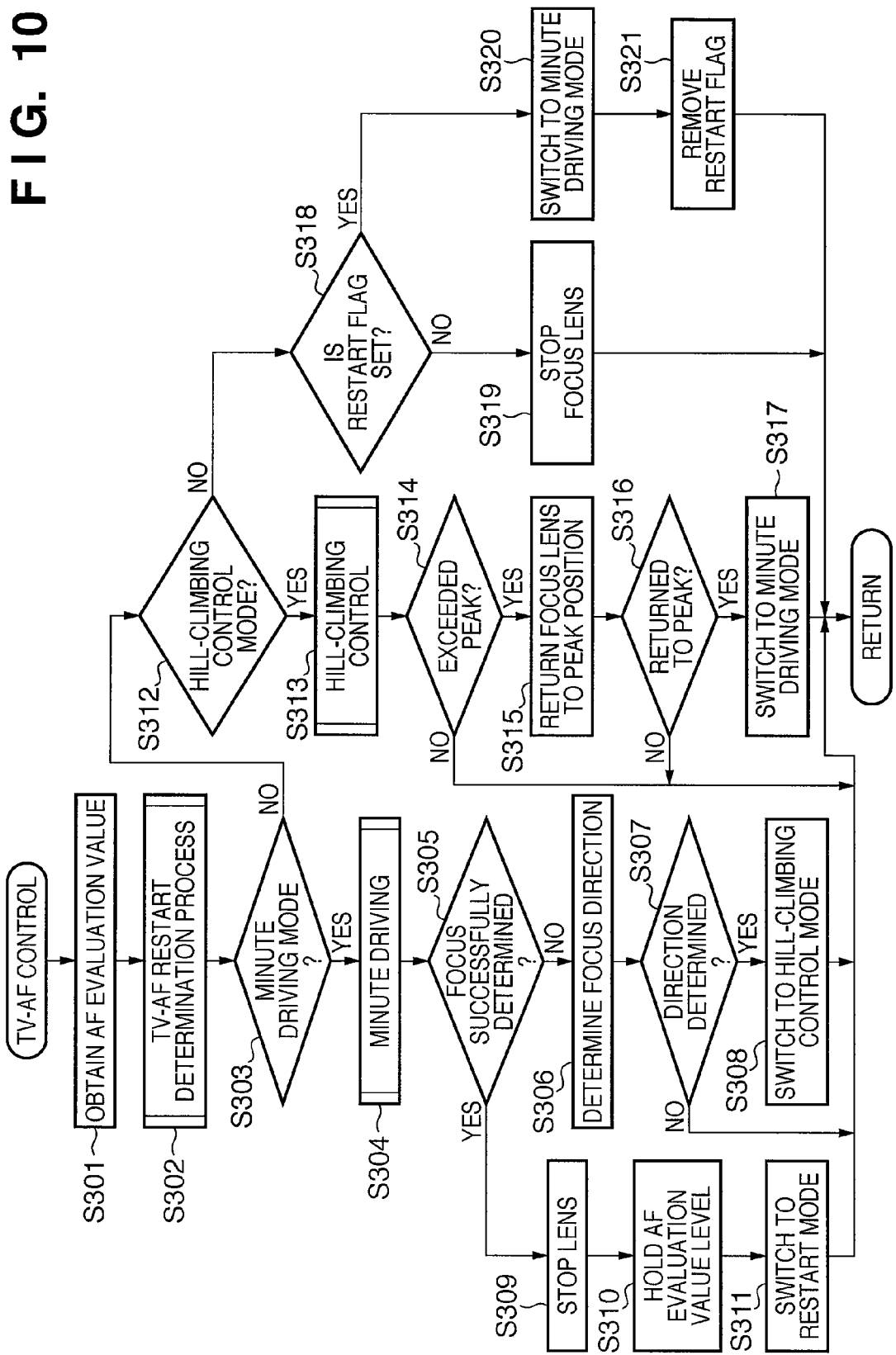
FIG. 10 is a flowchart illustrating a TV-AF control process shown in FIG. 9.
Figure 11:
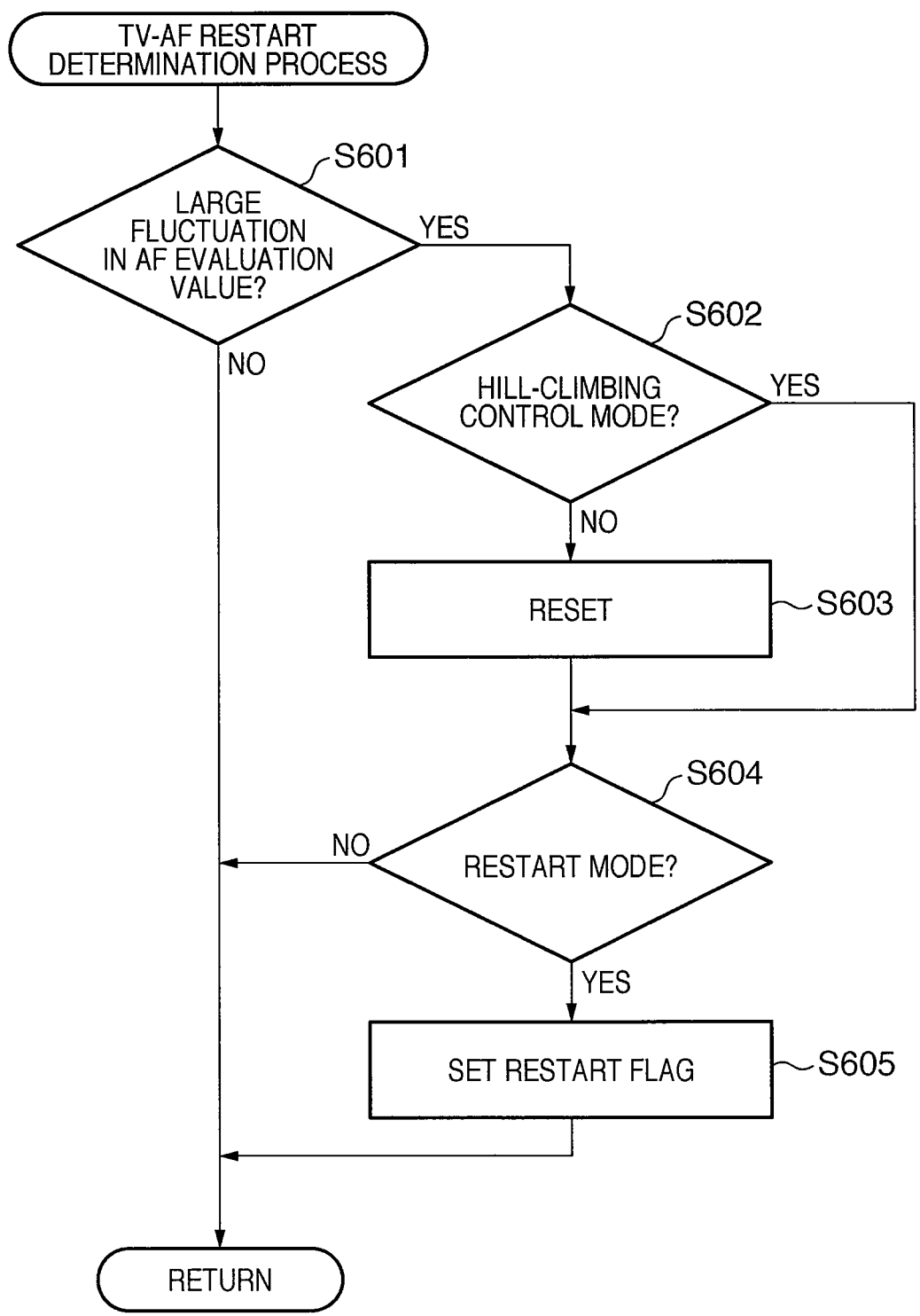
FIG. 11 is a flowchart illustrating a TV-AF restarting process shown in FIG. 9.

FIG. 10 and FIG. 11 are flowcharts illustrating the TV-AF control process indicated in steps S512 and S521 in FIG. 9.

In FIG. 10, first, an AF evaluation value is obtained (step S301). Then, a TV-AF restart determination process, which will be described later with reference to FIG. 11, is carried out (step S302).

Next, it is determined whether or not the TV-AF mode is a minute driving mode (step S303). The minute driving mode will be described later.

When the result of the determination carried out in step S301 indicates that the mode is the minute driving mode (YES in step S303), minute driving is carried out on the focus lens 106 (step S304). The minute driving will be described later using FIG. 12.

Next, it is determined whether or not the scene is in focus (step S305). When the result of the determination carried out in step S305 indicates that the scene is in focus (YES in step S305), the driving of the focus lens 106 is stopped (step S309).

Next, the AF evaluation value for when the focus lens 106 is in focus is stored in a memory (not shown) of the camera/AF microcomputer 118 (step S310).

Next, the current mode is changed to a driving redetermination mode (step S311).

When the result of the determination in step S305 indicates that the scene is not in focus (NO in step S305), it is determined which direction the in-focus position is relative to the current position of the focus lens 106 (step S306).

Next, in step S307, it is determined whether the direction of the in-focus position (called simply the "in-focus direction" hereinafter) could be determined.

When the result of the determination in step S307 indicates that the in-focus direction could be determined (YES in step S307), the TV-AF mode is switched to a hill-climbing control mode (step S308).

Meanwhile, when the result of the determination in step S303 indicates that the mode is not the minute driving mode (NO in step S303), it is determined whether or not the mode is the hill-climbing control mode (step S312).

When the result of the determination in step S312 indicates that the mode is the hill-climbing control mode (YES in step S312), hill-climbing control is carried out on the focus lens 106 at a predetermined speed (that is, in-focus position detection control is carried out) (step S313).

Next, it is determined whether or not the AF evaluation value has exceeded a peak during the hill-climbing control of the focus lens 106 (step S314).

When the result of the determination in step S314 indicates that the AF evaluation value has exceeded a peak (YES in step S314), the focus lens 106 is returned to the position at which the AF evaluation value reached the peak during the hill-climbing control of the focus lens 106 (called a "peak position" hereinafter) (step S315).

Next, it is determined whether or not the focus lens 106 has returned to the peak position (step S316).

When the result of the determination in step S316 indicates that the focus lens 106 has returned to the peak position (YES in step S316), the TV-AF mode is changed to the minute driving mode (step S317).

Meanwhile, when the result of the determination in step S312 indicates that the mode is not the hill-climbing control mode (NO in step S312), the current mode is the driving redetermination mode, and thus the process advances to step S318. In step S318, it is determined, through the TV-AF restart determination process of step S302 (mentioned later), whether or not a restart flag is set. When the restart flag is not set in step S318 (NO in step S318), the driving of the focus lens 106 is stopped (step S319).

When the result of the determination in step S318 indicates that the restart flag is set (YES in step S318), the TV-AF mode is changed to the minute driving mode (step S320). The restart flag is then removed (step S321).

FIG. 11 is a flowchart illustrating the TV-AF restart determination process of step S302 in FIG. 10.

First, the AF evaluation value stored in the memory (not shown) of the camera/AF microcomputer 118 is compared with the latest AF evaluation value, and it is then determined whether or not the difference between the two values is greater than a predetermined value, or in other words, whether or not the AF evaluation value has fluctuated greatly (step S601).

When the result of the determination in step S601 indicates that the AF evaluation value has fluctuated greatly (YES in step S601), it is determined whether or not the mode is the hill-climbing control mode (step S602).

When the result of the determination in step S602 indicates that the mode is not the hill-climbing control mode (NO in step S602), the restart process is carried out, or, if the mode is the minute driving mode, the data used in the TV-AF process is reset in order to restart the minute driving from an initial state (step S603). The process then advances to step S604.

When the result of the determination in step S602 indicates that the mode is the hill-climbing control mode (YES in step S602), the process advances to step S604.

Next, in step S604, it is determined whether or not the mode is a restart mode. When the result of the determination in step S604 indicates that the mode is the restart mode (YES in step S604), the restart flag is set (step S605). After this, the process ends. However, when the determination in step S604 indicates that the mode is not the restart mode (NO in step S604), the process ends.

Meanwhile, when the result of the determination carried out in step S601 indicates that the AF evaluation value has only fluctuated slightly (NO in step S601), the process ends directly.

Figure 12:
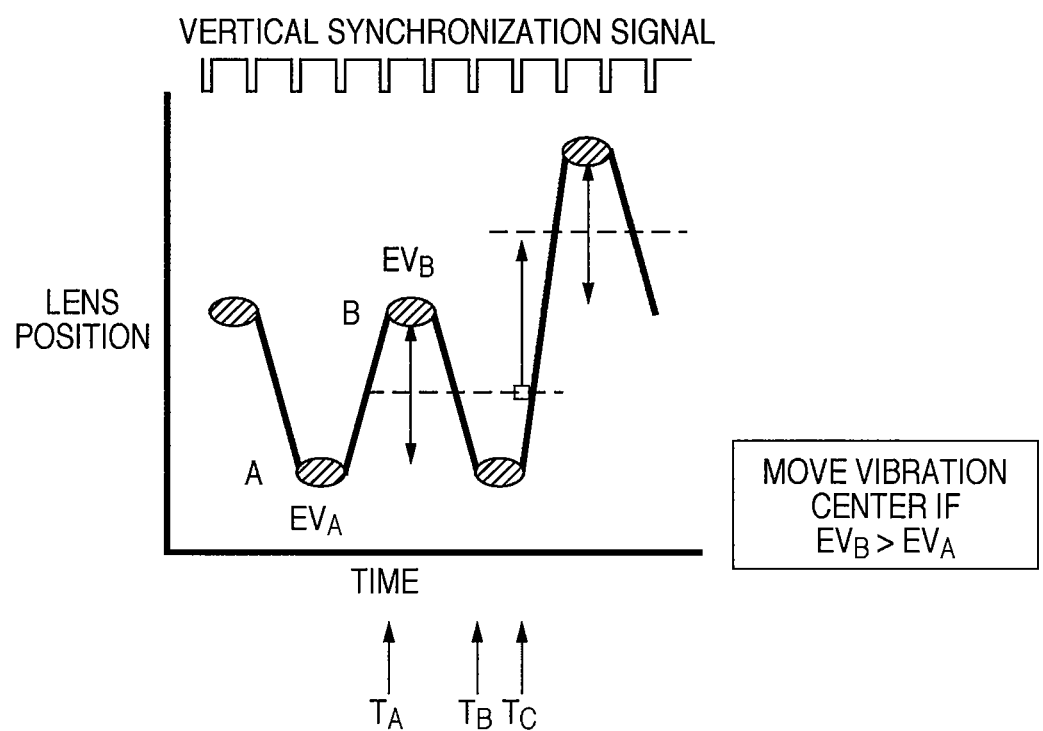
FIG. 12 is a diagram illustrating minute driving of a focus lens executed during the TV-AF control process shown in FIG. 10.

FIG. 12 is a diagram illustrating minute driving of the focus lens 106 executed in step S304 of the TV-AF process illustrated in FIG. 10.

In FIG. 12, the horizontal axis represents time, whereas the vertical axis indicates the position of the focus lens 106. Furthermore, the vertical synchronization signal of the video signal is shown at the top of FIG. 12.

As shown in FIG. 12, an AF evaluation value $EV_A$ for the charge accumulated in the image sensor 107 during an interval A (indicated by the diagonally-hatched oval in FIG. 12) is obtained at a time $T_A$, whereas an AF evaluation value $EV_B$ for the charge accumulated in the image sensor 107 during an interval B is obtained at a time $T_B$. Meanwhile, at a time $T_C$, the AF evaluation values $EV_A$ and $EV_B$ are compared, and if $EV_B > EV_A$, the driving (vibration) center of the minute driving is moved. However, if $EV_A > EV_B$, the vibration center is not moved. In this manner, it is during minute driving that the direction in which the AF evaluation value increases while moving the focus lens 106 is determined, the position of the focus lens 106 where the AF evaluation value is the greatest (that is, the peak position) is found, and so on.

Note that the control that causes the focus lens 106 to carry out minute driving in order to determine whether or not the scene is in focus based on a change in the AF evaluation value can also be called "focus confirmation control".

In addition, the control that causes the focus lens 106 to carry out minute driving in order to determine the in-focus direction based on a change in the AF evaluation value can also be called "in-focus direction determination control".

Figure 13:
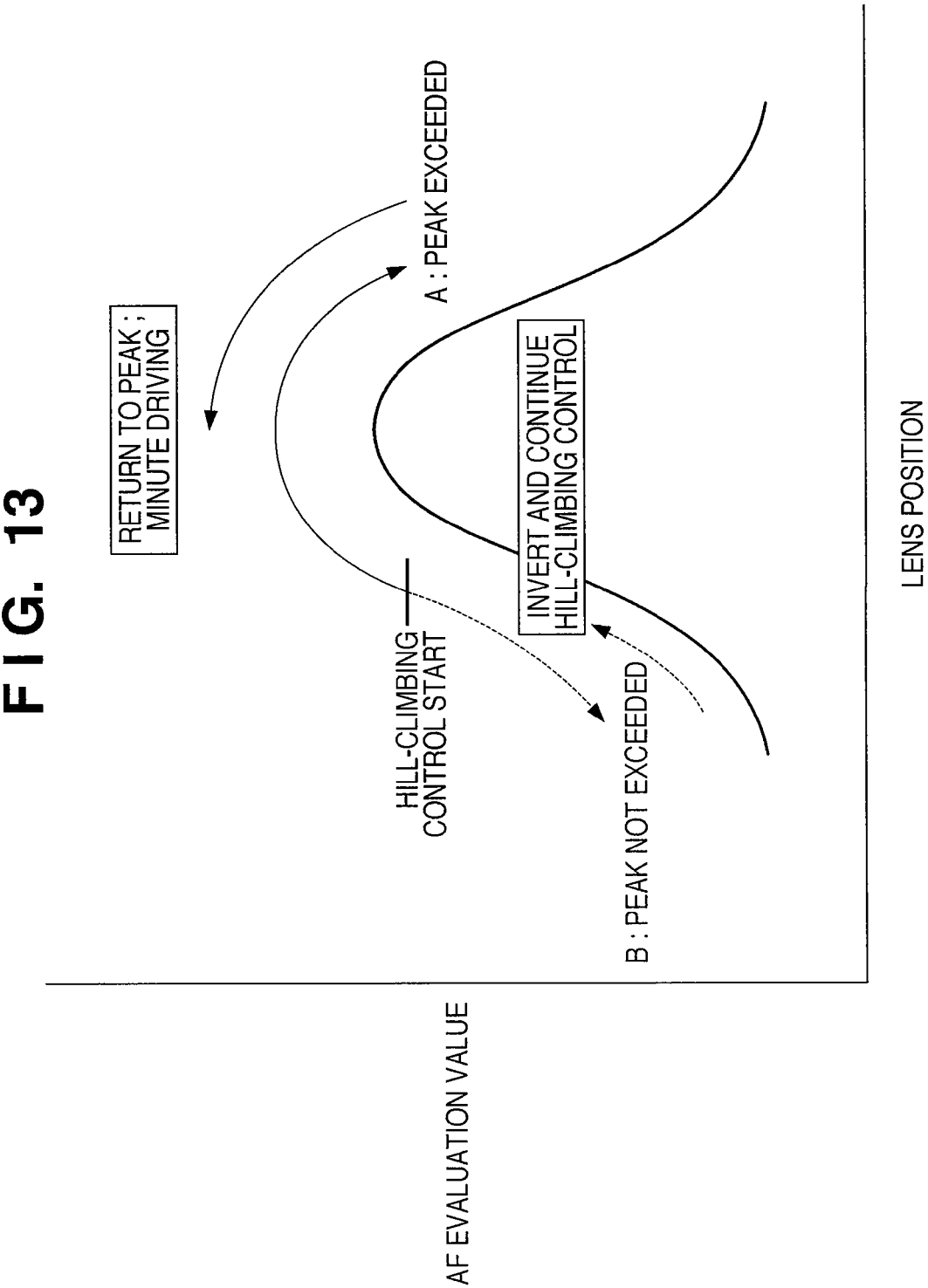
FIG. 13 is a diagram illustrating hill-climbing control of a focus lens executed during the TV-AF control process shown in FIG. 10.

FIG. 13 is a diagram illustrating hill-climbing control of the focus lens 106 executed in step S313 of the TV-AF process illustrated in FIG. 10.

In FIG. 13, the horizontal axis represents the position of the focus lens 106, whereas the vertical axis indicates the AF evaluation value.

As shown in FIG. 13, with the movement of A, the AF evaluation value decreases after exceeding the peak, and thus it is possible to confirm the presence of the peak position (the in-focus position). In this case, the hill-climbing control is terminated after the focus lens 106 has been returned to the vicinity of the peak position, and the driving is changed to minute driving. On the other hand, with the movement of B, there is no peak, and the AF evaluation value decreases monotonically; therefore, it can be determined that the focus lens 106 is being driven in the wrong direction. In this case, the focus lens 106 is driven in the opposite direction, and the hill-climbing control is continued. Accordingly, it is the hill-climbing control in which the focus lens 106 is driven and the peak position, or the vicinity thereof, at which the AF evaluation value peaks, obtained during the driving of the focus lens 106, is determined.

Figure 14:
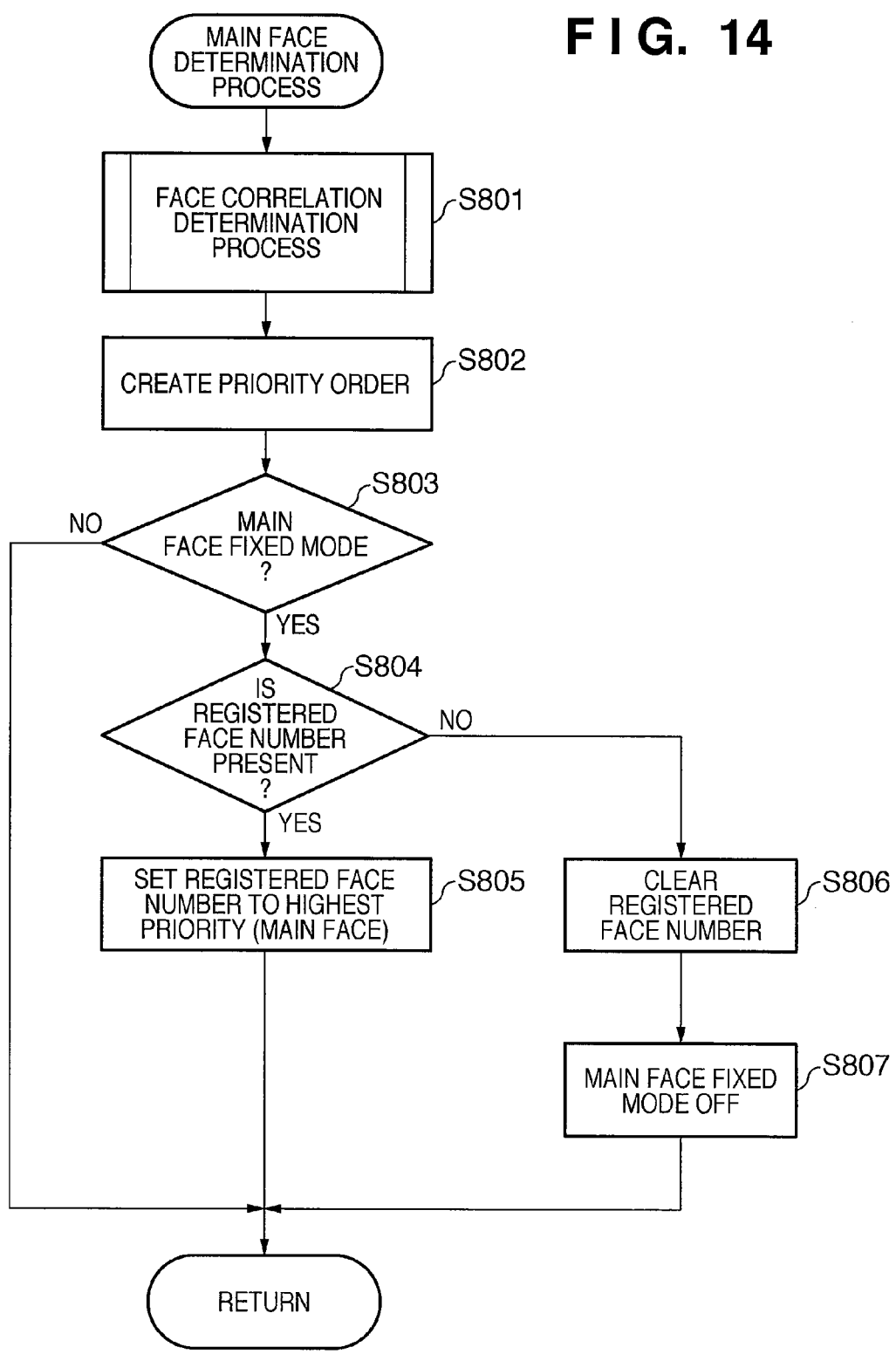
FIG. 14 is a flowchart illustrating a main face determination process according to the fourth embodiment.

FIG. 14 is a flowchart illustrating a main face determination process carried out by the camera/AF microcomputer 118.

First, in step S801, a face correlation determination process, which will be mentioned later, is carried out based on a face detection result obtained from the face detection unit 117. This process assigns face numbers at random to each of the detected faces.

Then, in step S802, a priority order is created based on the positions, sizes, and so on of the detected faces, and the face that is highest in the priority order is taken as the main face. In this case, the priority order is determined so that the priority is higher, for example, for faces whose positions are closer to the center of the scene, faces that are larger, and so on. Furthermore, in order to prevent faces that are frequently detected from switching, faces that were previously detected as well may be placed higher in the priority order; as long as the method for creating the priority order allows the shooter to feel that the face selected as the main face is suitable, the method is not limited to that described above.

In step S803, it is determined whether a main face fixing mode (not shown) is valid or invalid. Here, any input means that allows the shooter to make a selection, such as a settings menu or the like, may be used to set the main face fixing mode to valid/invalid. This can be carried out by providing the image capturing apparatus with an input unit that allows the shooter to carry out an operation for intentionally selecting a face, with the shooter carrying out the operation using a directional key, a touch panel, or the like. The "main face fixing mode" is thus a function that, rather than automatically determining the main face, continually takes a face selected and set as the main face by the shooter as the main face as long as that face is present in the scene.

The process ends in the case where the main face fixing mode is invalid, but if the main face fixing mode is valid, the process advances to step S804.

In step S804, the face numbers assigned to the faces obtained through the present face detection results are compared with a main face fixed face number that is stored, and it is determined whether or not a face that is fixed as the main face is present. In the case where a face that is fixed as the main face is present, the process advances to step S805, whereas in the case where a face that is fixed as the main face is not present, the process advances to step S806.

In step S805, the priority order determined in step S802 is changed so that the face that is fixed as the main face is highest in the priority order (that is, the main face), and the process ends.

In step S806, the main face fixed face number that is stored is deleted. The process then advances to step S807, where the main face fixing mode is invalidated and the state in which the main face is determined automatically is restored; the processing then ends.

Next, the face correlation determination process carried out in step S801 of FIG. 14 will be described with reference to FIG. 15. This process is repeated a number of times equivalent to the number of faces that are detected.

First, in step S901, the previous and current face detection results obtained by the face detection unit 117 are compared. To be more specific, the positions and sizes of the respective faces are compared, and if the previous position is close to the current position, and the previous size is similar to the current size, the faces are determined to be the same face. Identical faces are searched out in this manner, and a correlation amount is calculated in order to determine whether or not faces are the same face based on the positions and sizes of those faces; in the case where the correlation is high, the faces are determined to be the same face.

Next, it is determined in step S902 whether or not the faces are the same face; the same face number as before is set for the face that is the same as before (step S903), whereas a face that could not be determined to be the same face as before is determined to be a newly-detected face, and a new random face number is assigned thereto (step S904).

Here, to describe the present fourth embodiment with reference to FIG. 16, in the case where the first face detection AF mode is being used and the main subject is no longer is present due to the main face exiting the frame or the like, if another subject is present, that other subject may be focused on quickly. However, in the case of the second face detection AF mode, quickly focusing on another subject because that other subject is present causes the focal plane to move and results in a video that is difficult to edit. For this reason, in the case of the second face detection AF mode, if the main face is no longer present or the main face has changed, the mode is set to the focus detection prohibited mode, and AF control is prohibited for a predetermined amount of time. Through this, it is possible to shoot a scene that is aligned with the intentions of the shooter, and possible to reduce going against the intentions of the shooter and imparting a sense of displeasure on the shooter.

Furthermore, in the case of the first face detection AF mode, AF control is carried out continually, and it is therefore desirable for a subject that is in focus to be continually present. For this reason, in the case where the main face has changed, the amount of movement of the focus lens 106 during minute driving is increased compared to when the second face detection AF mode is used, which makes it possible to quickly determine the in-focus direction even in a state in which the next main face is blurred; this makes it possible to quickly focus on the next main face. Through this, the responsiveness of the AF control can be improved, and it is possible to quickly focus on the next main face, which in turn makes it possible to avoid imparting a sense of displeasure on the shooter.

Conversely, in the case of the second face detection AF mode, a subject that is continually in focus is not present, AF control is not carried out quickly on the next main face, and furthermore, it is not necessarily the case that the next main face is a subject that the shooter wishes to shoot. Furthermore, increasing the movement amount of the focus lens 106 makes it easier to see movement in the focal plane for defocused subjects that are in the background and so on. For this reason, when a face that has exited the frame once again enters the frame, the movement of the focal plane for the defocused subjects that are in the background and so on is immediately apparent after a state in which the focal plane was not moving when the face was not present, and it is thus thought that this will feel unnatural to the shooter. Accordingly, in the case where the main face has changed, the amount of movement of the focus lens 106 during minute driving is reduced compared to that in the first face detection AF mode, and control is carried out so as to give preference to the stability of the shot scene rather than the responsiveness of the AF control; this makes it possible to reduce imparting a sense of displeasure on the shooter.

In this manner, switching the AF control in accordance with the first and second face detection AF modes makes it possible to realize AF control that is suited to the intentions of the shooter.

Fifth Embodiment

Next, a fifth embodiment of the present invention will be described. The hardware configuration of the present fifth embodiment is the same as that described in the aforementioned fourth embodiment and illustrated in FIG. 8.

Figure 17:
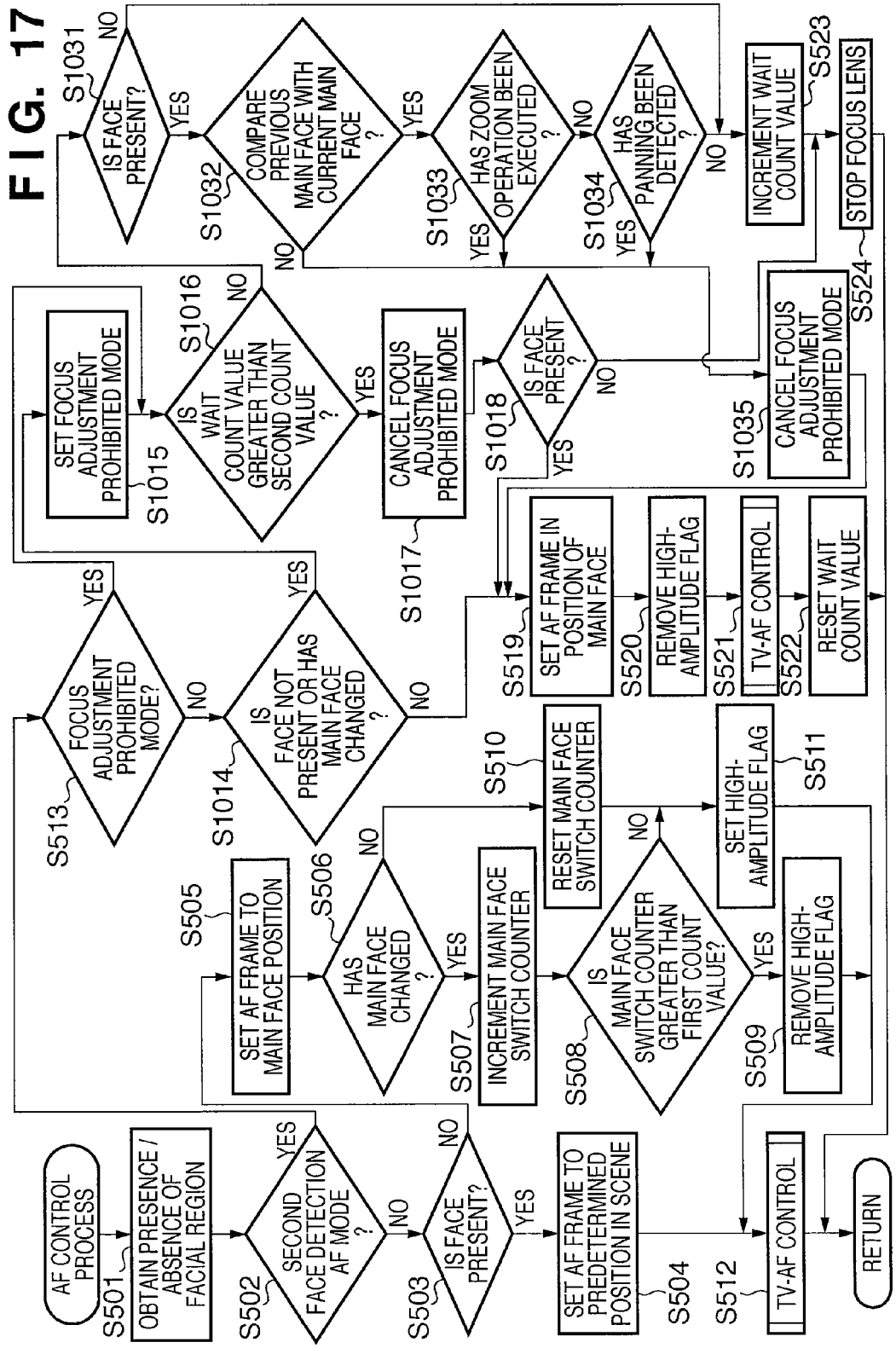
FIG. 17 is a flowchart illustrating an AF control process according to a fifth embodiment.

An AF control process according to the fifth embodiment will be described with reference to FIG. 17. FIG. 17 is a flowchart illustrating an AF control process executed by the camera/AF microcomputer 118 illustrated in FIG. 8.

This process is essentially the same as the AF control process according to the fourth embodiment; therefore, operations that are the same as those shown in FIG. 9 will be given identical reference numerals and descriptions thereof will be omitted, and only different operations will be described.

In the present fifth embodiment, when, in the second face detection AF mode, the main face is no longer present, in the case where another face is present or another face has appeared, whether or not to focus on that face is changed depending on the size and position of that other face or depending on camera operations.

In other words, in the second face detection AF mode, when a facial region is no longer present in step S1014 or the main face has changed, the mode is set to the focus detection prohibited mode in step S1015. In step S1016, it is determined whether or not the waiting count value has become greater than the second count value. Here, in the case where the waiting count value is equal to or less than the second count value, the process advances to step S1031.

In step S1031, it is determined whether or not a facial region is present based on the result of the detection performed by the face detection unit 117. In the case where the facial region is not present, an object that is to be focused on is not present, and thus the process advances to step S523, where the waiting count value is incremented and the focus lens 106 is stopped.

Conversely, in the case where a facial region is present in step S1031, another face that is different from the previous main face is present, and thus the process advances to step S1032.

Next, in step S1032, it is determined whether or not the difference between the size of the previous main face and the size of the present main face is less than a predetermined difference, and determined whether or not the difference between the position of the previous main face and the position of the present main face is less than a predetermined difference. Although the size of the faces and the position of the faces are compared here, it is also acceptable to compare only one of these elements. Alternatively, a characteristic amount of the faces may be used as the standard for determination. In that case, the characteristic amounts of the faces may be compared to determine how much those characteristic amounts resemble each other, and it may then be determined whether or not the degree of resemblance is less than a predetermined difference. For example, a situation can be considered in which face detection is temporarily impossible despite the object on which the shooter wishes to focus being the main face, such as a case where the main face looks to the side, the main face erroneously exits the frame temporarily, or the like. In this case, if focusing is prohibited even above the second count value because it is assumed that the main face is no longer present, tracking for the purpose of focusing cannot be carried out even if the main face that the shooter wishes to focus on appears once again, which will impart a sense of displeasure on the shooter. Accordingly, in the case where the main face has essentially the same size as the face that was being tracked previously, or is present in essentially the same position as the position of the face that was being tracked previously, the setting of the focus detection prohibited mode is canceled, the AF frame is set to the position of the main face, the TV-AF control is executed, and focusing is carried out.

Conversely, in the case where the difference between the size of the previous main face and the size of the current main face is greater than or equal to a predetermined difference, or the difference between the position of the previous main face and the position of the current main face is greater than or equal to a predetermined difference, it is determined that the faces are different, and the process advances to step S1033.

In step S1033, it is determined whether or not a zoom operation has been carried out by the shooter manipulating the zoom key 122. In the case where a zoom operation has been carried out, the setting of the focus detection prohibited mode is canceled (step S1035), the AF frame is set to the position of the main face (step S519), the high-amplitude flag is removed (step S520), the TV-AF control is executed, and focusing is carried out (step S521). However, in the case where a zoom operation has not been carried out, the process advances to step S1034.

In step S1034, it is determined by the shake detection unit 121 whether or not panning has been detected. In the case where panning has been detected, the setting of the focus detection prohibited mode is canceled (step S1035), the AF frame is set to the position of the main face (step S519), the TV-AF control is executed, and focusing is carried out (step S521). However, in the case where panning has not been detected, the process advances to step S523, where the waiting count value is incremented; then, in step S524, the focus lens 106 is stopped.

Here, a panning detection process performed by the video camera based on the shake signal detected by the shake detection unit 121 will be described with reference to FIG. 18 and FIG. 19; however, the present invention is not limited to this method, and any method may be used as long as it allows the shooter to determine that the camera is unstable.

Figure 18:
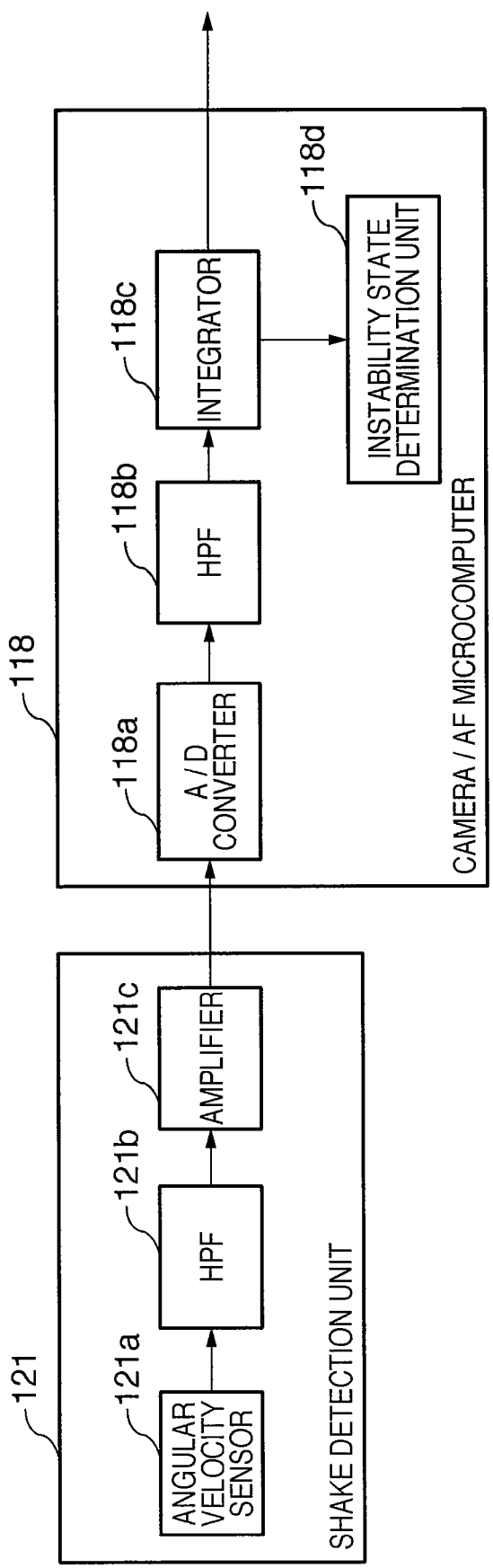
FIG. 18 is a block diagram illustrating a blur detection unit and a camera/AF microcomputer for carrying out panning detection.

In FIG. 18, 121a indicates an angular velocity sensor that detects instability in the video camera. 121b indicates a high-pass filter (denoted as "HPF" hereinafter) that eliminates the DC component from the output of the angular velocity sensor 121a. 121c indicates an amplifier that amplifies the output of the HPF 121b by a predetermined amount.

Next, the output of the shake detection unit 121 is input into the camera/AF microcomputer 118. 118a indicates an A/D converter that converts the analog output into a digital signal. 118b indicates an HPF that eliminates the DC component from the output of the A/D converter 118a, and 118c indicates an integrator that integrates the output of the HPF 118b and converts that integrated output into an angular displacement signal. 118d indicates an instability state determination unit to which the output of the integrator 118c is output as a control signal for the image stabilization system (not shown). A predetermined panning determination threshold is set in the instability state determination unit 118d, and it is determined whether or not the video camera is panning based on whether or not the output from the integrator 118c is greater than or equal to the threshold; the result of this determination is applied in a panning determination process in step S1034. Because there are situations where panning is detected temporarily due to the shooter's hand shaking, the time from which the output of the integrator 118c has become greater than or equal to the predetermined threshold may be included in the conditions for determining that panning is occurring.

Note that although two sets, or one each for the vertical direction and the horizontal direction, of the angular velocity sensor 121a, the HPF 121b, the amplifier 121c, the A/D converter 118a, the HPF 118b, the integrator 118c, and the instability state determination unit 118d, are normally employed, only one set is shown in FIG. 18 for the sake of simplicity.

Figure 19:
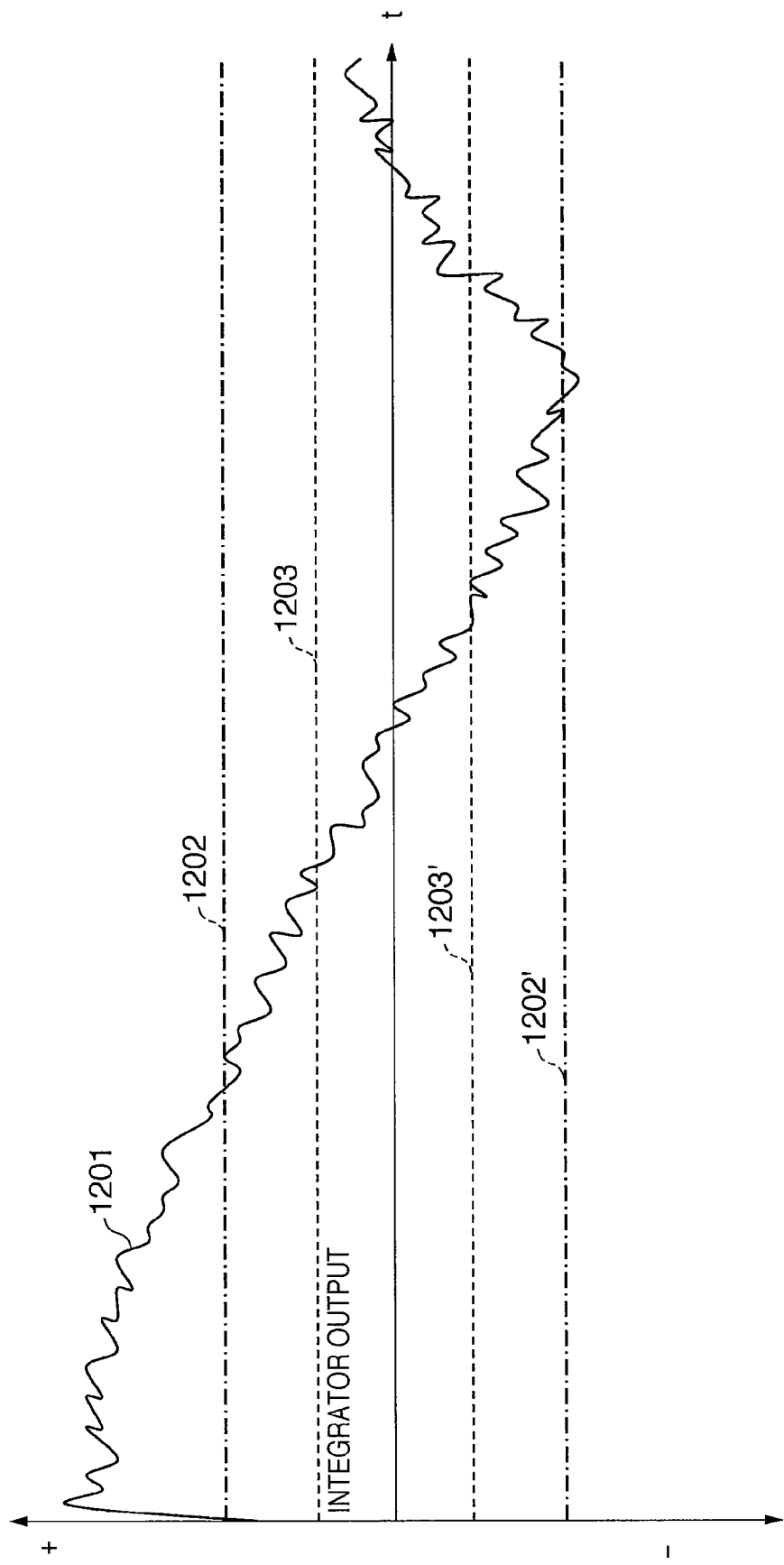
FIG. 19 is a diagram illustrating a panning determination threshold.

Next, FIG. 19 schematically illustrates the output of the integrator 118c in the case where the video camera is being panned by the shooter. In FIG. 19, the vertical axis expresses the output of the integrator 118c, whereas the horizontal axis expresses time. 1201 indicates the output of the integrator 118c. 1202 and 1202' indicate the panning determination thresholds. 1203 and 1203' indicate panning end determination thresholds. In the case where the output of the integrator 118c has become greater than or equal to the panning determination thresholds 1202 and 1202', and the output that is greater than or equal to the thresholds 1202 and 1202' has continued for a predetermined amount of time, it is determined that panning is being carried out.

Meanwhile, in the case where a predetermined amount of time in which the output of the integrator 118c is greater than or equal to the thresholds 1202 and 1202' has elapsed and the output has dropped below the panning end determination thresholds 1203 and 1203', it is determined that the panning has ended.

Here, zoom operations are detected in step S1033 or panning is detected in step S1034 because it can be thought that the shooter has intentionally changed his or her angle of view to focus on a different subject, the camera is facing a different subject due to camera shaking, or the like. In other words, because it is thought that the shooter is intentionally trying to shoot a different subject, continuing to prohibit AF control results in a longer amount of time until the next subject is focused on, which will impart a sense of displeasure on the shooter. For this reason, in the case where a zoom operation, panning, or the like has been detected, it is determined that the shooter has intentionally switched to another subject, and focusing is therefore executed; this makes it possible to reduce a sense of displeasure imparted upon the shooter.

As described thus far, according to the fifth embodiment, in the case where the main face is no longer present or it has been determined that the main face has been switched while the mode is the second face detection AF mode, the focus detection prohibited mode is set and AF control is prohibited. In the case where, during the focus detection prohibited mode, a main face is present and it has been determined that the size, position, and so on of the faces are essentially the same, it is determined that the subject that the shooter is attempting to shoot is the same subject, and thus the focus detection prohibited mode is canceled and AF control is executed. Meanwhile, in the case where zoom operations, panning, or the like have been detected, it is determined that the shooter has intentionally switched subjects, and thus the focus detection prohibited mode is canceled and AF control is executed. Through this, it is possible to shoot a scene that is aligned with the intentions of the shooter, and possible to reduce going against the intentions of the shooter and imparting a sense of displeasure on the shooter.

Sixth Embodiment

Next, a sixth embodiment of the present invention will be described. Note that the image capturing apparatus described in the first embodiment with reference to FIG. 1 or the image capturing apparatus described in the fourth embodiment with reference to FIG. 8 can be used as the image capturing apparatus according to the present sixth embodiment, and thus descriptions thereof will be omitted here.

Note also that in the present sixth embodiment, the AF mode switch 119 enables the shooter to switch between a first AF mode and a second AF mode. Here, the "first AF mode" is a mode in which an AF area is set in a position that includes a facial region within the shot scene in the case where a face has been detected based on the result output by the face detection unit 117, whereas the AF area is set in a pre-set fixed region in the case where a face has not been detected. On the other hand, the "second AF mode" is a mode in which an AF area is set in a position that includes a facial region within the shot scene in the case where a face has been detected based on the result output by the face detection unit 117, whereas focus adjustment operations are stopped in the case where a face has not been detected. Note that this AF mode switch 119 may also allow the selection of another AF mode, in addition to the aforementioned first AF mode and second AF mode, for, for example, setting the AF area to a pre-set fixed region regardless of the result output by the face detection unit 117.

Next, focus adjustment control carried out by the camera/AF microcomputer 118 will be described with reference to FIG. 20.

Figure 20:
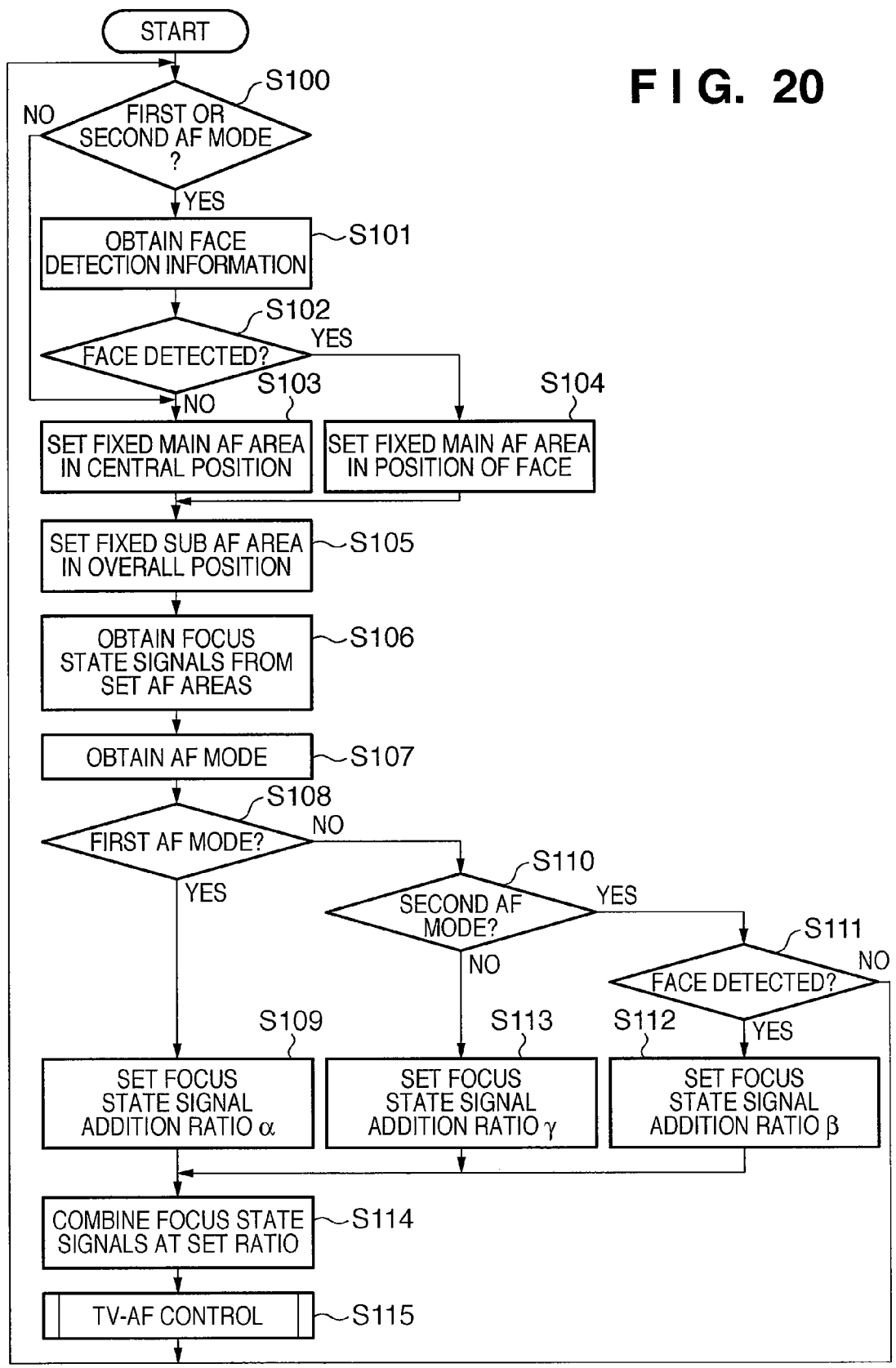
FIG. 20 is a flowchart illustrating a procedure for generating a focus state signal used in focus adjustment operations according to a sixth embodiment.

FIG. 20 is a flowchart illustrating a focus adjustment control procedure according to the sixth embodiment. In step S100 of FIG. 20, information of the current AF mode that is set by the AF mode switch 119 is obtained, and it is determined whether the first or second AF mode is set; if one of these modes is set, the process advances to step S101, whereas if one of these modes is not set, the process advances to step S103. In step S101, information of a face detection process result is obtained from the face detection unit 117. In step S102, it is determined whether or not a face has been detected based on the information obtained in step S101; in the case where a face has not been detected, the process advances to step S103, whereas in the case where a face has been detected, the process advances to step S104. In step S103, a main AF area is set in a fixed position in the center of the shot scene, in a position that is not based on the face detection result. In step S104, a face position is set to the main AF area based on the face detection information obtained in step S101, as shown in, for example, FIG. 23.

Figure 23:
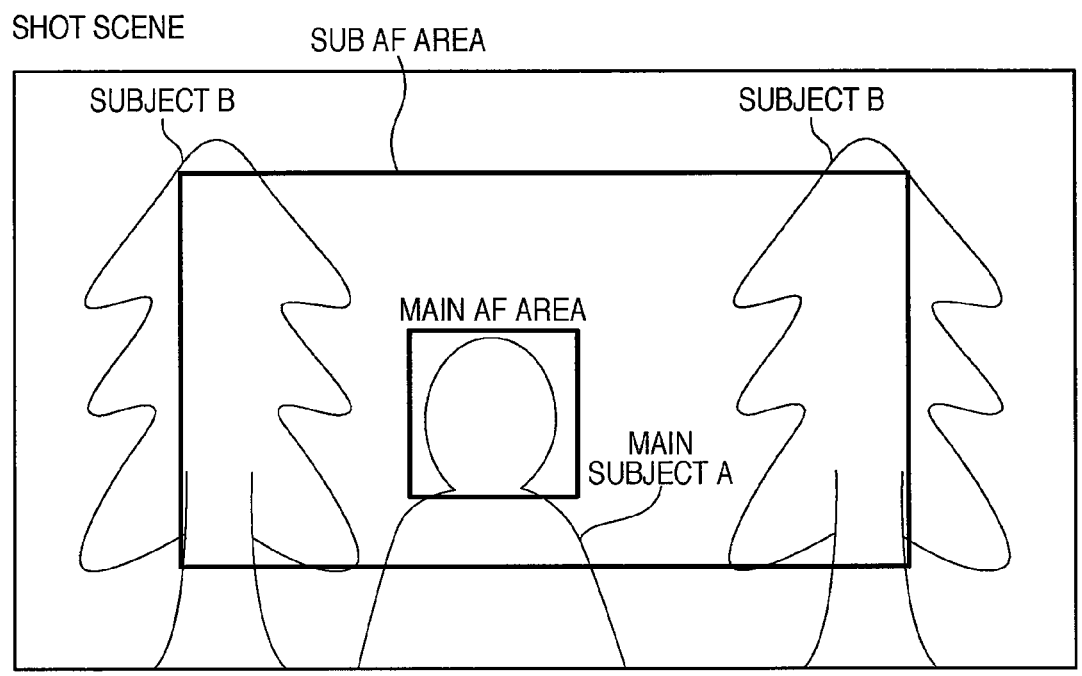
FIG. 23 is a diagram illustrating a conventional example of an AF area found when a face has been detected.
Figure 24:
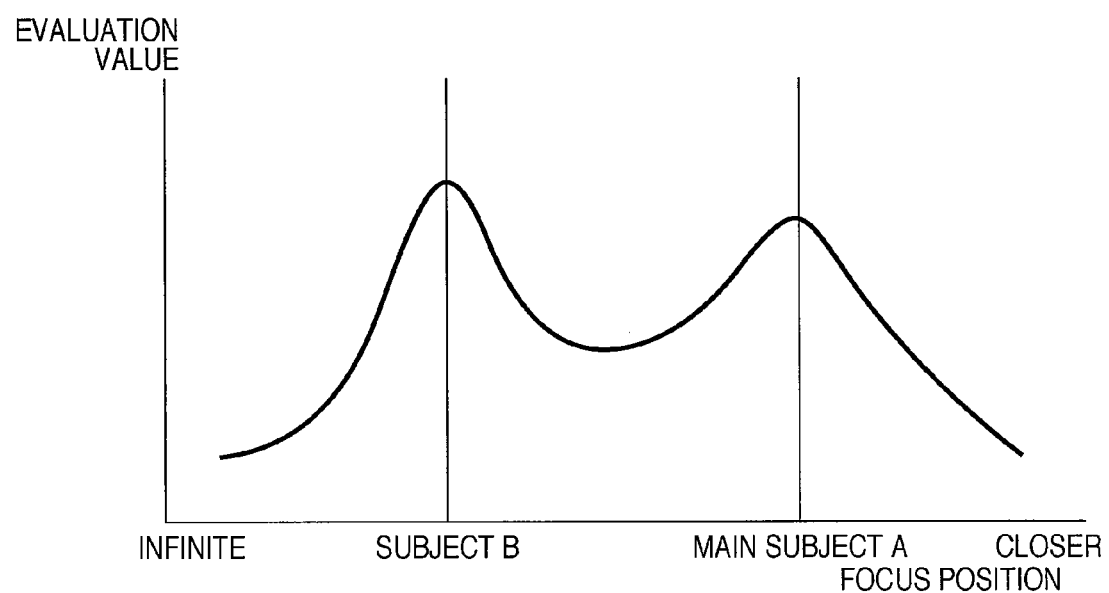
FIG. 24 is a diagram illustrating the state of a focus state signal resulting from the image illustrated in FIG. 23.
Figure 25A:
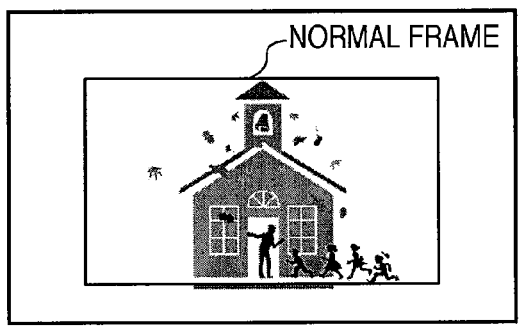
FIGS. 25A to 25E are diagrams illustrating an example of an image obtained through conventional "face AF".
Figure 25D:
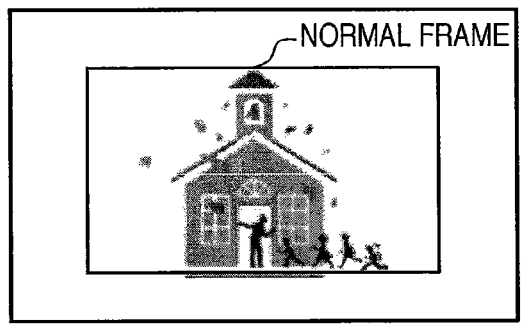
Figure 25B:
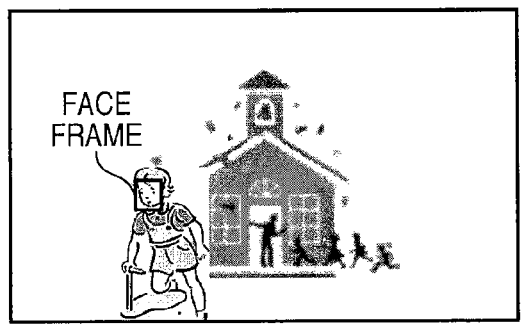
Figure 25E:
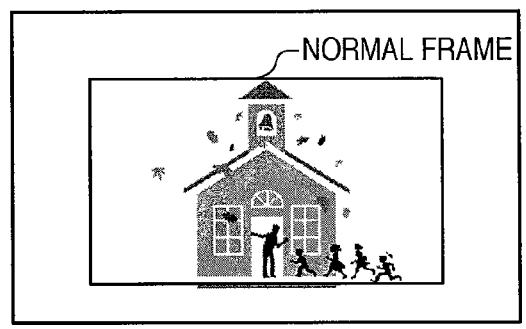
Figure 25C:
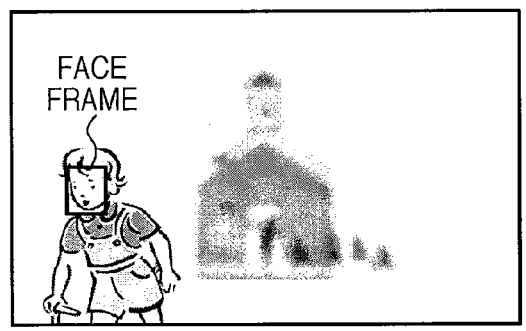

In step S105, a sub AF area is set in a fixed position in a region that includes the main AF area set in step S103 or step S104, in a position that is not based on the face detection result, as shown in, for example, FIG. 23. Note that the AF signal processing unit 116 can obtain the focus state signal, upon which the TV-AF control is based, by setting the main AF area in step S103 or step S104, and by setting the sub AF area in step S105. In addition, a filter coefficient is set within the AF signal processing unit 116 at this time, thus constructing multiple band pass filters having different extraction properties. The "extraction properties" refer to the frequency properties of the band pass filters, and the settings here refer to changing the set values of the band pass filters in the AF signal processing unit 116.

In step S106, focus state signals for the main AF area set in step S103 or step S104 and the sub AF area set in step S105 are obtained. Note that in the sixth embodiment, focus state signals of the main AF area set in the facial position are assumed to be stored in a memory or the like as a history. This is because in the case where the main AF area set for the facial position on which control is to be carried out has changed, the history can be reused when combining the focus state signals in S114, which will be mentioned later.

In step S107, information of the current AF mode set by the AF mode switch 119 is obtained. In step S108, it is determined whether or not the current AF mode obtained in step S107 is the first AF mode; in the case where the current AF mode is the first AF mode, the process advances to step S109, whereas when such is not the case, the process advances to step S110. In step S109, as a process carried out during the first AF mode, the camera/AF microcomputer 118 determines and sets an addition ratio α to be used when combining the focus state signals obtained in step S106 in step S114, which will be mentioned later. This addition ratio α is an addition ratio between the focus state signal obtained from the main AF area set in step S103 or step S104 and the focus state signal obtained from the sub AF area set in step S105. The addition ratio α here is set to be less than an addition ratio γ, mentioned later (that is, γ>α), in order to increase the relative weight of focus state signals corresponding to faces of people that have low contrast and make it easier to focus on the main subject.

Meanwhile, in step S110, it is determined whether or not the current AF mode obtained in step S107 is the second AF mode; in the case where the current AF mode is the second AF mode, the process advances to step S111, whereas when such is not the case, the process advances to step S113. In step S111, it is once again determined whether or not a face has been detected based on the information obtained in step S101, and in the case where a face has been detected, the process advances to step S112. In the case where a face has not been detected, however, AF control is not carried out; therefore, the process returns to step S101, thus ending the process. In step S112, as a process carried out during the second AF mode, the camera/AF microcomputer 118 determines and sets an addition ratio β to be used when combining the focus state signals obtained in step S106 in step S114, which will be mentioned later. This addition ratio β is an addition ratio between the focus state signal obtained from the main AF area set in step S104 and the focus state signal obtained from the sub AF area set in step S105. Here, the addition ratio β is set to be lower than the addition ratio α used in the first AF mode and set in step S109 (that is, α>β). Through this, the relative weight of focus state signals corresponding to faces of people that have low contrast is increased, which makes it easier to focus on the main subject than with past techniques. Note that the addition ratio β here may be set to 0 in order to avoid using the focus state signal obtained from the sub AF area set in step S105 during the second AF mode.

In step S113, as a process carried out aside from the first and second AF modes, the addition ratio γ to be used when combining the focus state signals obtained in step S106 in step S114, which will be mentioned later, is set. This addition ratio γ is an addition ratio between the focus state signal obtained from the main AF area set in step S103 and the focus state signal obtained from the sub AF area set in step S105.

In step S114, the focus state signals obtained in step S106 are combined based on the addition ratio set in step S109, step S112, or step S113. In step S115, focus adjustment is carried out through the TV-AF method based on the focus state signals combined in step S114, after which the process returns to step S101. Note that the methods described above with reference to FIG. 10 through FIG. 13 can be used as the focus adjustment based on the TV-AF method using the focus state signals, and thus detailed descriptions thereof will be omitted here.

As described thus far, according to the sixth embodiment, when the second AF mode is set, the addition ratio for the focus state signal obtained from the main AF area set to the facial region is increased more than when the first AF mode is set. In this manner, the addition ratio between the focus state signals obtained from the main AF area and the sub AF area is changed in accordance with the AF mode that is set. This makes it possible to carry out focus adjustment in a stable manner on the subject intended by the shooter in the case where the focus adjustment is to be carried out under limited conditions, particularly, for example, when a face is detected.

Note that information indicating which facial area information the focus adjustment operations are being carried out in accordance with (for example, a frame surrounding the main AF area) may be displayed in the display unit 110.

Although the main AF area is a region for a face detected in the shot scene (in the case where a face is detected) in the sixth embodiment, it should be noted that a specific subject aside from a face may be detected through image detection. For example, cutting out and detecting a subject image from the background can be considered. In addition, a position within the shot scene may be input through an external input unit, or a position in the shot scene may be determined by detecting the line of sight of the shooter that is looking into the viewfinder.

Seventh Embodiment

Figure 21:
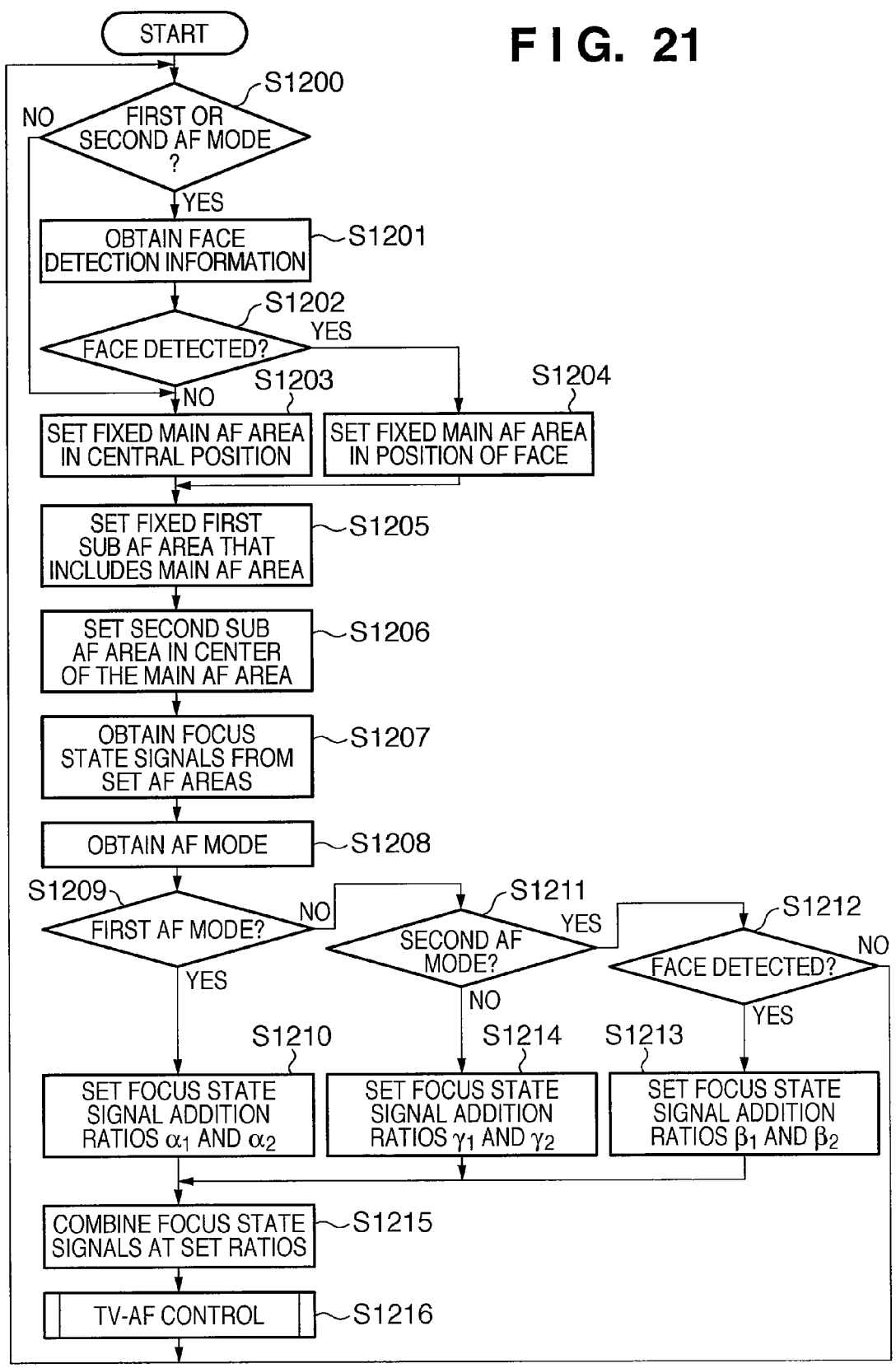
FIG. 21 is a flowchart illustrating a procedure for generating a focus state signal used in focus adjustment operations according to a seventh embodiment.

Next, a seventh embodiment of the present invention will be described. Note that the configuration described in the first embodiment with reference to FIG. 1 or the configuration described in the fourth embodiment with reference to FIG. 8 can be used as the configuration of the image capturing apparatus according to the seventh embodiment, and thus descriptions thereof will be omitted here. The seventh embodiment differs from the aforementioned sixth embodiment in that two sub AF areas are set, and the focus adjustment control illustrated in FIG. 21 is carried out instead of the focus adjustment control described with reference to FIG. 20. In order to achieve the desired effects with the minimum necessary configuration, in the aforementioned sixth embodiment, the sub AF area is disposed only in a fixed position that is not based on the face detection result. However, in the present seventh embodiment, a second sub AF area is disposed in the central position of the main AF area in order to keep the subject in focus with certainty. Hereinafter, a procedure for the focus adjustment control according to the seventh embodiment will be described with reference to the flowchart in FIG. 21.

In step S1200 of FIG. 21, information of the current AF mode that is set by the AF mode switch 119 is obtained, and it is determined whether the first or second AF mode is set; if one of these modes is set, the process advances to step S1201, whereas if one of these modes is not set, the process advances to step S1203. In step S1201, information of a face detection process result is obtained from the face detection unit 117. In step S1202, it is determined whether or not a face has been detected based on the information obtained in step S1201; in the case where a face has not been detected, the process advances to step S1203, whereas in the case where a face has been detected, the process advances to step S1204. In step S1203, a main AF area is set in a fixed position in the center of the shot scene, in a position that is not based on the face detection result. Meanwhile, in step S1204, the main AF area is set based on the face detection information obtained in step S1201, as shown in, for example, FIG. 22.

Figure 22:
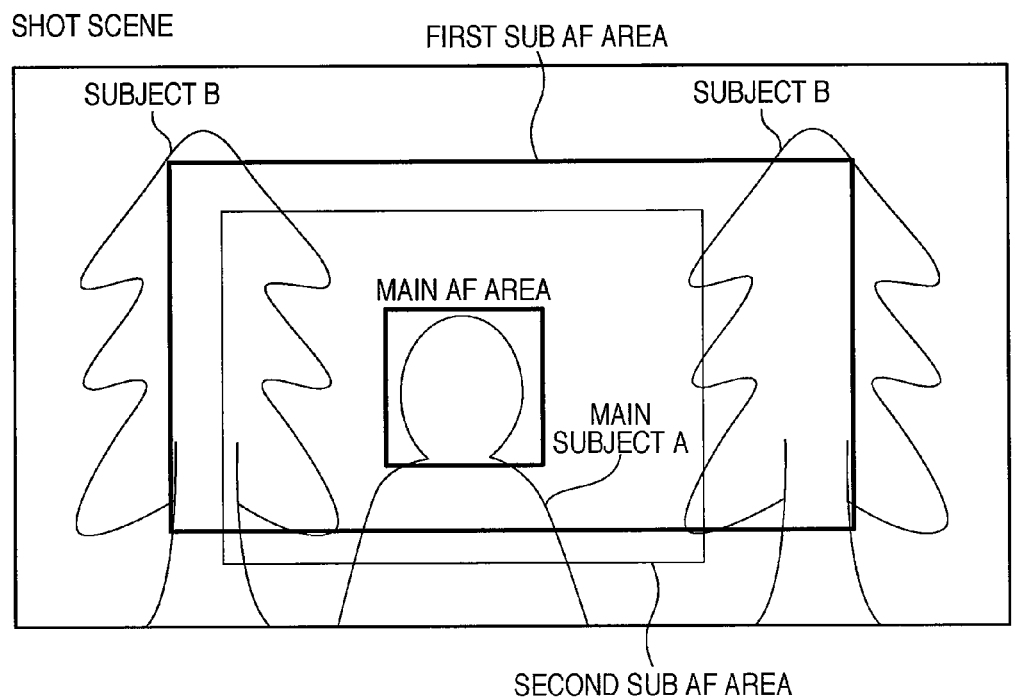
FIG. 22 is a diagram illustrating examples of a main AF area, a first sub AF area, and a second sub AF area according to the seventh embodiment.

In step S1205, the first sub AF area is set in a fixed position in a region that includes the main AF area set in step S1203 or step S1204, in a position that is not based on the face detection result, as shown in, for example, FIG. 22. Furthermore, in the seventh embodiment, in step S1206, the second sub AF area is set in a region in the center of the main AF area set in step S1203 or step S1204, as shown in, for example, FIG. 22. Note that setting the main AF area in step S1203 or step S1204 and setting the first and second sub AF areas in step S1205 and step S1206 makes it possible for the AF signal processing unit 116 to obtain the focus state signals that serve as the basis for the TV-AF control. In addition, a filter coefficient is set within the AF signal processing unit 116 at this time, thus constructing multiple band pass filters having different extraction properties.

In step S1207, the focus state signals of the main AF area set in step S1203 or step S1204 and the first and second sub AF areas set in step S1205 and step S1206 are obtained. Note that in the seventh embodiment, focus state signals of the main AF area set in the facial position are assumed to be stored in a memory or the like as a history, as in the aforementioned sixth embodiment.

In step S1208, information of the current AF mode that is set by the AF mode switch 119 is obtained. In step S1209, it is determined whether or not the current AF mode obtained in step S1208 is the first AF mode; in the case where the mode is the first AF mode, the process advances to step S1210, whereas when such is not the case, the process advances to step S1211. In step S1210, as a process carried out during the first AF mode, the camera/AF microcomputer 118 determines and sets addition ratios $\alpha_1$ and $\alpha_2$ used when combining the focus state signals obtained in step S1207 in step S1215, which will be mentioned later. Here, the addition ratio $\alpha_1$ is an addition ratio between the focus state signal obtained from the main AF area set in step S1203 or step S1204 and the focus state signal obtained from the first sub AF area set in step S1205. Meanwhile, the addition ratio $\alpha_2$ is an addition ratio between the focus state signal obtained from the main AF area set in step S1203 or step S1204 and the focus state signal obtained from the second sub AF area set in step S1206. Here, the addition ratio $\alpha_1$ is set to be less than an addition ratio $\gamma_1$, mentioned later (that is, $\gamma_1 > \alpha_1$), and the addition ratio $\alpha_2$ is set to be greater than an addition ratio $\gamma_2$, mentioned later (that is, $\gamma_2 < \alpha_2$), in order to increase the relative weight of focus state signals corresponding to faces of people that have low contrast and make it easier to focus on the main subject.

Meanwhile, in step S1211, it is determined whether or not the current AF mode obtained in step S1208 is the second AF mode; in the case where the mode is the second AF mode, the process advances to step S1212, whereas when such is not the case, the process advances to step S1214. In step S1212, it is once again determined whether or not a face has been detected based on the information obtained in step S1201; in the case where a face has been detected, the process advances to step S1213. In the case where a face has not been detected, however, AF control is not carried out; therefore, the process returns to step S1201, thus ending the process. In step S1213, as a process carried out during the second AF mode, the camera/AF microcomputer 118 determines and sets addition ratios $\beta_1$ and $\beta_2$ used when combining the focus state signals obtained in step S1207 in step S1215, which will be mentioned later. Here, the addition ratio $\beta_1$ is an addition ratio between the focus state signal obtained from the main AF area set in step S1204 and the focus state signal obtained from the first sub AF area set in step S1205. Meanwhile, the addition ratio $\beta_2$ is an addition ratio between the same focus state signal obtained from the main AF area set in step S1204 and the focus state signal obtained from the second sub AF area set in step S1206. Here, the addition ratio $\beta_1$ is set so as to be lower than the addition ratio $\alpha_1$ used during the first AF mode and set in step S1210 (that is, $\alpha_1 > \beta_1$), and the addition ratio $\beta_2$ is set so as to be greater than the addition ratio $\alpha_2$ used during the first AF mode and set in step S1210 (that is, $\alpha_2 < \beta_2$). Through this, the relative weight of focus state signals corresponding to faces of people that have low contrast is increased even further, which makes it easier to focus on the main subject than with past techniques. Note that as in the sixth embodiment, the addition ratio $\beta_1$ here may be set to 0 in order to avoid using the focus state signal obtained from the first sub AF area set in step S205 during the second AF mode.

In step S1214, as processes aside from the first and second AF modes, the addition ratios $\gamma_1$ and $\gamma_2$ used when combining the focus state signals obtained in step S1207 in step S1215, which will be mentioned later, are set. Here, the addition ratio $\gamma_1$ is an addition ratio between the focus state signal obtained from the main AF area set in step S1203 and the focus state signal obtained from the first sub AF area set in step S1205. Meanwhile, the addition ratio $\gamma_2$ is an addition ratio between the same focus state signal obtained from the main AF area set in step S1203 and the focus state signal obtained from the second sub AF area set in step S1206.

In step S1215, the focus state signals obtained in step S1207 are combined based on the addition ratio set in step S1210, step S1213, or step S1214. In step S1216, focus adjustment according to the TV-AF method is carried out based on the focus state signal obtained from the combination carried out in step S1215, in the same manner as in the sixth embodiment, after which the process returns to step S1201.

Through this, according to the seventh embodiment, the relative weight of focus state signals corresponding to faces of people that have low contrast is increased even further than in the aforementioned sixth embodiment, which makes it easier to focus on the main subject than with past techniques.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-162212, filed on Jul. 16, 2010, 2010-192702, filed on Aug. 30, 2010, and 2010-192917, filed on Aug. 30, 2010 which are hereby incorporated by reference herein in their entirety.

What is claimed is:

1. A focus adjustment apparatus comprising:
    a detection unit that detects a subject/subjects having a predetermined characteristic from an image obtained while shooting a moving picture;
    an automatic focusing unit configured to perform focus control by automatically moving a focus lens on the basis of the image;
    a manual focusing unit configured to move the focus lens on the basis of an operation of a shooter on a focus operation unit for manipulating a position of the focus lens; and
    a setting unit configured to set a first AF mode or a second AF mode,
    wherein, in the first AF mode,
        in a state in which the subject/subjects are detected by the detection unit, the automatic focusing unit is selected and the automatic focusing unit performs focus control by setting an AF area corresponding to the detected subject/subjects and moving the focus lens on the basis of an image within the AF area, and
        in a state in which the subject/subjects are not detected by the detection unit, the manual focusing unit is selected and the manual focusing unit does not move the focus lens without any operation on the focus operation unit,
    and wherein, in the second AF mode,
        in a state in which a subject/subjects are detected by the detection unit, the automatic focusing unit is selected and the automatic focusing unit performs focus control by setting an AF area corresponding to the detected subject/subjects and moving the focus lens on the basis of an image within the AF area, and
        in a state in which a subject/subjects are not detected by the detection unit, the automatic focusing unit is selected and the automatic focusing unit performs focus control by setting an AF area in the image and moving the focus lens on the basis of an image within the AF area.

2. The focus adjustment apparatus according to claim 1, wherein in the case where a plurality of subjects having the predetermined characteristic have been detected, when a subject that was focused on a previous time by the focus adjustment unit controlling the focus lens exists among the plurality of detected subjects, the selection unit selects that subject as the subject that fulfils the predetermined condition.

3. The focus adjustment apparatus according to claim 2, further comprising:
    an input unit,
    wherein when a subject that was focused on a previous time by the focus adjustment unit controlling the focus lens does not exist among the plurality of detected subjects and an input for selecting one of the plurality of subjects has been made through the input unit, the selection unit selects the subject selected through the input unit as the subject that fulfils the predetermined condition.

4. The focus adjustment apparatus according to claim 3, wherein in the case where a subject that fulfils the predetermined condition has not been selected by the selection unit, the focus adjustment unit does not control the focus lens.

5. The focus adjustment apparatus according to claim 1, wherein in the case where the automatic focusing unit is selected in the first AF mode, the shooter is notified that the subject is being focused on, and in the case where the manual focusing unit is selected in the first AF mode, the shooter is notified that the subject is not being focused on by automatic focusing operation.

6. A focus adjustment method comprising the steps of:
- detecting a subject/subjects having a predetermined characteristic from an image obtained while shooting a moving picture;
- selecting a first AF mode or a second AF mode;
- setting the first AF mode if the first AF mode is selected, and a manual focusing unit; and
- setting the second AF mode if the second AF mode is selected, wherein, in the first AF mode,
- in a state in which the subject/subjects are detected in the detecting step, an automatic focusing unit is selected and the automatic focusing unit performs focus control by setting an AF area corresponding to the detected subject/subjects and moving a focus lens on the basis of an image within the AF area, and
- in a state in which the subject/subjects are not detected in the detecting step, a manual focusing unit is selected and the manual focusing unit does not move the focus lens without any operation on a focus operation unit for manipulating a position of the focus lens, and wherein, in the second AF mode,
- in a state in which a subject/subjects are detected in the detecting step, the automatic focusing unit is selected and the automatic focusing unit performs focus control by setting an AF area corresponding to the detected subject/subjects and moving the focus lens on the basis of an image within the AF area, and
- in a state in which a subject/subjects are not detected in the detecting step, the automatic focusing unit is selected and the automatic focusing unit performs focus control by setting an AF area in the image and moving the focus lens on the basis of an image within the AF area, and wherein the automatic focusing unit is configured to perform focus control by automatically moving the focus lens on the basis of the image, and the manual focusing unit is configured to move the focus lens on the basis of an operation of a shooter on the focus operation unit.

7. A non-transitory readable storage medium having stored thereon a program which is executable by a computer, the program having a program code for realizing the focus control method according to claim 6.

* * * * *